(12) United States Patent
Mutalik et al.

(10) Patent No.: US 9,515,765 B2
(45) Date of Patent: Dec. 6, 2016

(54) DISTRIBUTED OPTICAL COMBINING: OBI FREE, POWER FREE

(71) Applicant: ARRIS Enterprises, Inc., Suwanee, GA (US)

(72) Inventors: Venkatesh G. Mutalik, Middletown, CT (US); Marcel F. Schemmann, Maria Hoop (NL)

(73) Assignee: ARRIS Enterprises, Inc., Suwanee, GA (US)

( * ) Notice: Subject to any disclaimer, the term of this patent is extended or adjusted under 35 U.S.C. 154(b) by 0 days.

(21) Appl. No.: 14/676,874

(22) Filed: Apr. 2, 2015

(65) Prior Publication Data

US 2015/0304064 A1  Oct. 22, 2015

Related U.S. Application Data

(60) Provisional application No. 62/100,173, filed on Jan. 6, 2015, provisional application No. 61/982,089, filed on Apr. 21, 2014, provisional application No. 62/043,793, filed on Aug. 29, 2014.

(51) Int. Cl.
*H04B 10/80* (2013.01)
*H04J 14/02* (2006.01)
*H04Q 11/00* (2006.01)

(52) U.S. Cl.
CPC ......... *H04J 14/0221* (2013.01); *H04B 10/807* (2013.01); *H04J 14/0282* (2013.01); *H04Q 11/0005* (2013.01); *H04Q 11/0067* (2013.01); *H04Q 11/0071* (2013.01); *H04Q 2011/0016* (2013.01)

(58) Field of Classification Search
CPC . H04B 10/807; H04J 14/0221; H04J 14/0282; H04Q 11/0005; H04Q 11/0067; H04Q 11/0071; H04Q 2011/0016
USPC .......................................................... 398/48
See application file for complete search history.

(56) References Cited

U.S. PATENT DOCUMENTS

| | | |
|---|---|---|
| 5,262,883 A | 11/1993 | Pidgeon |
| 5,331,449 A | 7/1994 | Huber et al. |
| 5,796,890 A | 8/1998 | Tsuji et al. |
| 5,914,799 A | 6/1999 | Tan |
| 6,041,056 A | 3/2000 | Bigham et al. |
| 7,941,022 B1 | 5/2011 | Schaffner et al. |
| 8,837,953 B2 | 9/2014 | Mutalik et al. |

(Continued)

FOREIGN PATENT DOCUMENTS

| | | |
|---|---|---|
| EP | 1235434 B1 | 10/2005 |
| EP | 2530861 A2 | 12/2012 |
| GB | 2315626 A | 2/1998 |

OTHER PUBLICATIONS

"OBI free", retrieved from the Internet at <http://www.ennc-web.com/J_emc/index.php?option=com_content&view=article&id=165:obi-free&catid=47:paper&Itemid=182\> on Mar. 24, 2015.

(Continued)

*Primary Examiner* — David Singh
(74) *Attorney, Agent, or Firm* — Lori Anne D. Swanson

(57) ABSTRACT

Implementing a laser into a system that uses a remote powered combiner or an aggregating combiner (AC) with one or more in-range contributing combiners may provide power to the downstream contributing combiners (CC). The power may be provided on the same fiber that downstream signals and the upstream signals traverse.

17 Claims, 25 Drawing Sheets

(56) References Cited

U.S. PATENT DOCUMENTS

| | | | |
|---|---|---|---|
| 2002/0008901 A1* | 1/2002 | Kinoshita | H01S 3/06725 359/341.1 |
| 2006/0275037 A1* | 12/2006 | Evans | H04B 10/27 398/71 |
| 2007/0183778 A1* | 8/2007 | Jung | H04J 14/0226 398/72 |
| 2010/0014867 A1 | 1/2010 | Ramanitra et al. | |
| 2013/0004174 A1* | 1/2013 | Lee | H04J 14/0246 398/79 |

OTHER PUBLICATIONS

A. Tan, "Super Pon-A Fiber to the Home Cable Network for CATV and POTS/ISDN/VOD as Economical as a Coaxial Cable Network", Journal of Lightwave Technology, vol. 15, No. 2, Feb. 1997, pp. 213-218.

"HRL Laboratories, LLC: About Us", retrieved from the Internet at <http://www.hrl.com/aboutUs/abt_main.html> on Mar. 24, 2015.

A. Al-Banna, et al., "Beat it! Handling Optical Beat Interference in RFOG Systems", ARRIS White Paper, ARRIS Enterprises, Inc., 2014, 31 pgs.

V. Mutalik, et al., "Partnership for Extended Capacity: DOCSIS 3.1 with RFoG", ARRIS White Paper, 2013, 18 pgs.

V. Mutalik, et al., "Partnership for Extended Capacity: DOCSIS 3.1 with RFoG", ARRIS PowerPoint Presentation, 2014 Spring Technical Forum, Apr. 30, 2014.

Wake, D., et al., "Optically Powered Remote Units for Radio-Over-Fiber Systems", Journal of Lightwave Technology, vol. 26, No. 15, Aug. 15, 2008.

PCT Invitation to Pay Additional Fees for PCT/US15/024108, mailed on Jun. 5, 2015.

PCT International Search Report and Written Opinion for PCT/US151025108, mailed on Aug. 11, 2015.

Taiwan Search Report, RE: Application No. 104112771, dated Jul. 19, 2016.

* cited by examiner

DISTRIBUTED OPTICAL COMBINING: OBI FREE, POWER FREE

CROSS-REFERENCE TO RELATED APPLICATIONS

This application claims the benefit of priority under 35 U.S.C. §119(e) to U.S. Provisional Application No. 61/982,089, filed on Apr. 21, 2014, U.S. Provisional Application No. 62/043,793, filed on Aug. 29, 2014, and U.S. Provisional Application No. 62/100,173, filed on Jan. 6, 2015.

BACKGROUND

An existing impairment of radio frequency over glass (RFoG) communication channels is Optical Beat Interference (OBI), which afflicts traditional RFoG networks. OBI occurs when two or more reverse path transmitters are powered on, and are very close in wavelength to each other. OBI limits upstream traffic, but also can limit downstream traffic. Existing efforts at mitigating OBI include adjusting ONUs to be wavelength specific, creating an RFoG-aware scheduler in the CMTS, changing ONU wavelengths in real-time, or combining multiple upstream inputs nominally in the same wavelength range.

However, such solutions for reducing or eliminating OBI require additional power. For example, to combine multiple upstream inputs nominally in the same wavelength range without the occurrence of OBI requires power to drive the photodiodes and the retransmitting laser. Some OBI reducing/eliminating devices have optical amplifiers, such as EDFAs, to aid in downstream splitting, which also requires additional power.

While distributed OBI free combining may result from employing a four-port combiner followed by four eight-port combiners and daisy chaining them together, such solution requires power to be provided at five spots (as opposed to power in just one spot with a thirty-two port combiner). The increased need for power is in contrast to the concept of FTTH, which is expected to be more passive and less reliant on powering. An exponential increase in power points is perceived as a reliability weakness in FTTH deployments, increases expenses, may not accommodate currently implemented splitting networks well, and may work well only in greenfield applications where the power system is laid simultaneously with the fiber network.

Improved techniques for reducing distortions in a network without the existing needs for increased power are desirable.

BRIEF DESCRIPTION OF THE DRAWINGS

For the purpose of illustrating embodiments described below, there are shown in the drawings example constructions of the embodiments; however, the embodiments are not limited to the specific methods and instrumentalities disclosed. In the drawings.

Figure 1:
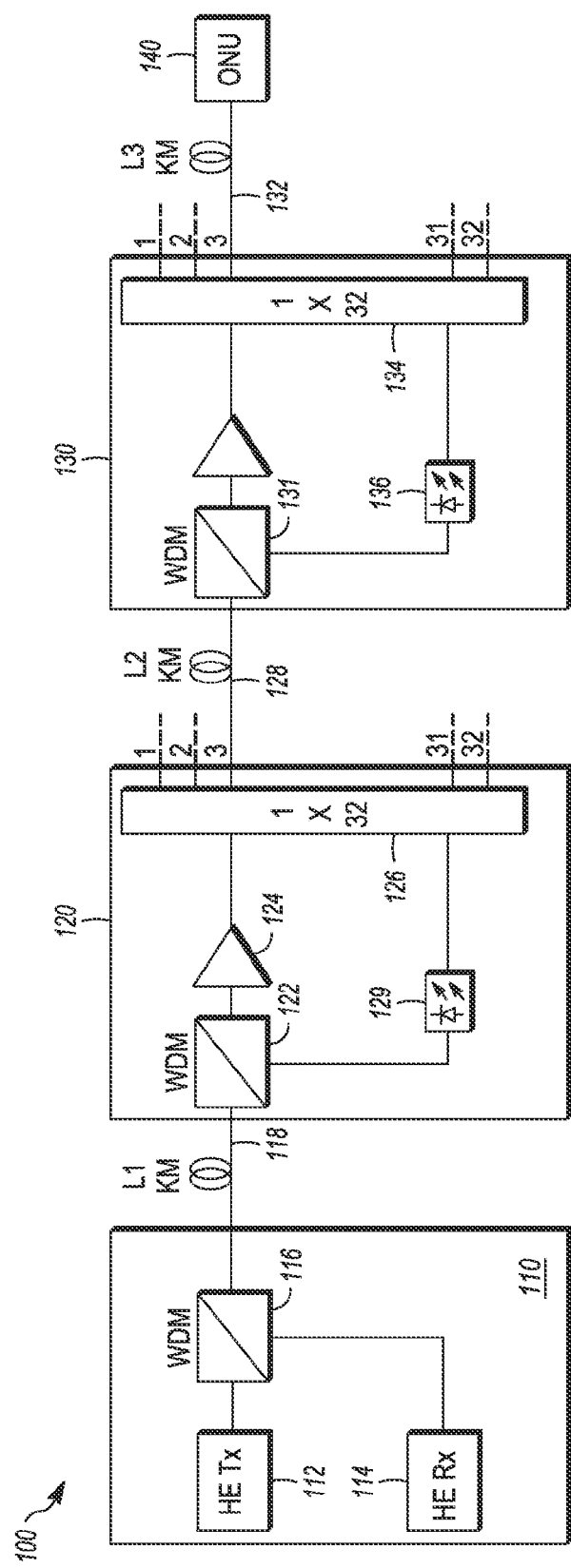
FIG. 1 shows a system 100 for delivering content, e.g., CATV content, to a plurality of subscribers over a network, such as the RFoG network described above.

It is noted that while the accompanying Figures serve to illustrate embodiments of concepts that include the claimed invention, and explain various principles and advantages of those embodiments, the concepts displayed are not necessary to understand the embodiments of the present invention, as the details depicted in the Figures would be readily apparent to those of ordinary skill in the art having the benefit of the description herein.

DETAILED DESCRIPTION

Disclosed herein are enabling distributed OBI Free combining without the increased need for power required by existing solutions. Embodiments disclosed for distributed OBI Free combining include systems that may function without requiring a prohibitively larger number of power locations in the network than otherwise required in a network that employs OBI reduction techniques.

Modern CATV transmission systems have replaced much of the legacy RF transmission path with a more effective optical network, creating a hybrid transmission system where cable content originates and terminates as RF signals over coaxial cables, but is converted to optical signals for transmission over the bulk of the intervening distance between the content provider and the subscriber. Specifically, CATV networks include a head end at the content provider for receiving RF signals representing many channels of content. The head end receives the respective RF content signals, multiplexes them using an RF combining network, converts the combined RF signal to an optical signal (typically by using the RF signal to modulate a laser) and outputs the optical signal to a fiber-optic network that communicates the signal to one or more nodes, each proximate a group of subscribers. The node then reverses the conversion process by de-multiplexing the received optical signal and converting it back to an RF signal so that it can be received by viewers.

Improvements to CATV architectures that provide further improvements in delivery of content include Fiber-to-the Premises (FTTP) architectures that replace the coaxial network between a node and a subscriber's home with a fiber-optic network. Such architectures are also called Radio Frequency over Glass (RFoG) architectures. A benefit of RFoG is that it provides for faster connection speeds and more bandwidth than current coaxial transmission paths are capable of delivering. For example, a single copper coaxial pair conductor can carry six phone calls, while a single fiber pair can carry more than 2.5 million phone calls simultaneously. FTTP also allows consumers to bundle their communications services to receive telephone, video, audio, television, any other digital data products or services simultaneously.

An RFoG topology includes an all-fiber service from the headend to a field node or optical network unit (ONU), which is typically located at or near the user's premises. In the headend, a downstream laser sends a broadcast signal that is optically split multiple times. The optical network unit, or ONU, recovers the RF broadcast signal and passes it into the subscriber's coax network.

FIG. 1 shows a system 100 for delivering content, e.g., CATV content, to a plurality of subscribers over a network, such as the RFoG network described above. In example RFoG systems, the head end 110 delivers content to an ONU 140 at a customer's premises through a node. The system architecture in FIG. 1 is shown with a head end 110 having a transmitter 112 that outputs a signal to a fiber link 118 of L1 km for delivering a downstream signal to one or more splitters. The headend also may include a receiver 114 connected to a WDM splitter 116 that may receive a signal from a fiber link 118 of L1 km. The fiber link 118 is connected to an active splitter/combiner unit 120.

The example splitter/combiner unit 120 shown may include a WDM 122 that separates forward path signals from reverse path signals. As used herein, the terms "forward path" and "downstream" may be interchangeably used to refer to a path from a head end to a node, a node to an end-user, or a head end to an end user. Conversely, the terms "return path", "reverse path" and "upstream" may be interchangeably used to refer to a path from an end user to a node, a node to a head end, or an end user to a head end.

The forward path signal from the WDM 122 is provided to a higher power multi-port amplifier that distributes power. For example, FIG. 1 depicts a higher power multi-port amplifier that outputs an amplified optical signal to the active 1x32 splitter 126 that has 32 output ports to respective second fiber links 128. In embodiments, the higher power multi-port amplifier is an Erbium Doped Fiber Amplifier (EDFA) 124 that internally distributes power over the 32 outputs of the combiner 120, each output operated at a relatively high power, e.g. approximately 18 decibel-milliwatts (dBm). The WDM 122 may pass 1550 nm light from the EDFA 124 in the forward direction and direct reverser light, such as at 1610 nm or 1310 nm, in the reverse direction to the receiver in the headend 110.

At each port, the power level may be modest, e.g., in the 0-10 dBm range. The active splitter/combiner unit 120 may be located within a node and a plurality of active/splitter combiner units 130 may be connected to active splitter/combiner unit 120 over a short distance, such as 1-3 km or less through fiber 128. Each of the 32 ports of the splitter/combiner 126 output, through a respective fiber 128, a respective signal to a second active splitter/combiner unit 130 of the same type and configuration as the splitter/combiner unit 120. An example of an active splitter/combiner unit is ARRIS's AgileMax®© splitter/combiner unit. The length(s) of the fiber 128 may vary with respect to each other. The output power per splitter 130 port is low, around 0 dBm. The splitter ports are connected to ONUs, for instance in a Multiple Dwelling Unit (MDU) or a neighborhood, via fiber 132 of length L3.

In the reverse direction, either or both of the 1x32 port splitters 126, 134 may operate as an active combiner 126, 134. Each combiner 126, 134 may include (not shown) a WDM per port directing upstream light to a detector that converts the received optical signal to an electrical signal and amplifies it in the RF domain. The combiner 126, 134 may then provide the electrical signal to a transmitter 129, 136 that outputs light at, for example, 1610 nm, 1310 nm, or some other appropriate wavelength, provided to the WDM 122 or 170, which in turn directs the upstream light into fiber, such as fiber 128 or fiber 118. Thus, along the return path from the subscriber's ONU 14 to the head end, a splitter/combiner 130 may operate to combine signals in the reverse direction for upstream transmission along fiber length 128, and a splitter/combiner 120 may operate to combine signals in the reverse direction for upstream transmission along fiber length 118. The combined signals may be transmitted upstream to a Cable Model Termination Service (CMTS) in the head end 110. Combined with the forward power limit on the fiber, the combined signals may require one forward fiber (L1 km) per group of 32 subscribers. At the head end, the fiber 118 is connected to WDM 116 that directs the upstream light to the receiver 114.

Optical networking units (ONUs) 140 in an RFoG environment terminate the fiber connection at a subscriber-side interface and convert traffic for delivery over the in-home network at the customer premises. Coaxial cable can be used to connect the ONUs of an RFoG network to one or more user device, wherein the RFoG user devices can include cable modems, EMTAs, or set-top boxes, as with the user devices of an HFC network. For example, the R-ONU may connect to set-top boxes, cable modems, or like network elements via coaxial cable, and one or more of the cable modems may connect to the subscriber's internal telephone wiring and/or to personal computers or like devices via Ethernet or Wi-Fi connections.

The ONUs 140 convert the forward transmitted light to RF signals for the in-home coaxial network. The ONUs 140 also receive RF signals from the in-home network and modulate these signals onto a laser, operating at 1610 nm for example, and the laser's output is sent upstream into the fiber L3. The upstream signal is combined with other upstream signals in the combiner 134 and/or combiner 126 and transmitted further upstream in fibers L2 and L1. At the WDM 122 the upstream signals are directed towards the head end receivers 114 over fiber L1.

The sum of the fiber lengths L1+L2+L3 is up to 25 km. The system 100, however, will permit a higher total length of fiber between the head end and the ONUs, such as 40 km, because the system 100 can tolerate a higher SNR loss, as further described below.

The upstream signals from the ONU 140 are individually terminated directly at the active splitter/combiner unit 130; even for ONUs operating at 0 dBm, the power reaching the detectors is around −2 dBm (the fiber 132 is a short fiber up to a few km, and the WDM loss inside the active combiner is small). This is almost 20 dB higher than in existing RFoG systems, meaning that the RF levels after the detector in the splitter 134 is almost 40 dB higher than in existing RFoG systems. As a consequence, the receiver noise figure is not critical and high bandwidth receivers can be used with relatively poor noise performance. The received RF signal is re-transmitted via the transmitter 136 along the reverse path into fiber 128 and received and retransmitted by the preceding active splitter/combiner unit 120 and thereafter to the head end 110. Although the repeated re-transmission leads to some incremental reduction in SNR, improvements in SNR from the active architecture provides much greater overall performance relative to traditional RFoG systems. More importantly, because all reverse signals are individually terminated at separate detectors, such as a multiple detector receiver as described in patent application (TBD), there can be no optical beat interference (OBI) between different reverse signals. The reverse signals are not combined optically, hence OBI cannot occur.

In the forward direction there may be multiple EDFAs 124; these EDFAs are cost effective single stage devices with low power dissipation—typically 2 Watts or less. Cascading the EDFAs results in an accumulation of noise due to the finite noise figures of the EDFAs. Whereas the active splitter architecture does not require the EDFAs (the high power head end 110 EDFA could still be used to provide power to the ONUs 140) the use of EDFAs inside the active splitter units may provide some advantages. For example, the complexity and power dissipation of equipment in the head end 110 is greatly reduced, as is the fiber count emanating from the head end 110. The amount of power delivered to the ONUs 140 is readily increased to approximately 0 dBm. As a consequence, ONU receivers obtain 12 dB more RF level from their detectors and do not need as high an SNR or gain. Even with relaxed SNR requirements at the ONU receivers, permitting a higher thermal noise contribution of the receivers, the SNR impact due to EDFA noise is easily overcome due to the higher received power. In addition, additional spectrum can be supported in the forward direction with an acceptable SNR relative to current architectures, such as 4 GHz instead of 1 GHz in current RFoG, hence total data throughput rates can grow significantly without a change in operation to permit for example, services that provide 40 Gbps download speeds and 10 Gbps upload speeds.

In embodiments, the optical combiner(s) 120, 130 provides upstream and downstream RFoG capability and a completely transparent and reciprocal avenue for PON transmission. The optical combiner(s) 120, 130 may enable complete transparency for PON deployments. For example, the optical combiner(s) 120, 130 may enable OBI free and high capacity features by deployment in compatible HFC D3.1 capable FTTH networks. Likewise, the optical combiner 120, 130 may be incorporated in to GPON, 1G-EPON, XGPON1, 10G/1G-EPON, 10G/10G-EPON. The compatibility with HFC and D3.1 enables the disclosed optical combiner(s) 120, 130 to be deployed alongside a current HFC network, and is D3.1 ready. The optical combiner(s) 120, 130 may be deployed on a fiber node, on multiple dwelling units (MDU) and on single family home (SFU) deployments.

The optical combiner 120, 130 may be independent of ONUs, Cable Modems and CMTSs. The optical combiner 120, 130 may be CMTS agnostic, thus relieving the burden of creating an RFoG aware scheduler that is both restrictive and time consuming. The optical combiner 120, 130 assists to make a cable version of FTTH more feasible, as compared to the PON alternatives. For example, in embodiments, the optical combiner 120, 130 has a reciprocal PON Pass thru capability of the optical combiner 120, 130 along with a high upstream and downstream capacity, which assists RFoG deployment without interruption to the underlaid system or impairment to future inclusion of PON functionality, such as later PON deployment on an RFOG system.

Traditional RFoG and PON networks have a fixed power budget. This means that a longer reach results in lesser splits and a larger split results in shorter reach. This reach/split combination is a fundamental limit of these networks. The disclosed embodiments may enable both a longer reach and a larger Split. Thus, embodiments are described that may advance FTTH topology and make FTTH deployment feasible.

In embodiments, the optical combiner 120, 130 has 32 ports, but only requires one transmit port, one receive port, and one WDM component at the headend 110. Thus, instead of requiring 32 WDMs and 32 receive ports, the optical combiner may save on head end space and power. The combiner 120 may be an active device that needs approximately 2 Watts of power. The optical combiner 120 may be powered by power sources readily available in the RFoG system, or power can be provisioned in to the optical combiner. The power source may include a battery back-up or solar/fiber power alternatives. If the power is lost and the battery has also drained, the entire reciprocal PON transmission is unaffected. The upstream RFoG transmission is however stopped. In a conventional RFoG system it would have been stopped also because the preponderance of OBI would have severely impaired the system anyway if the system was a traditional RFoG system with a passive combiner. Also in case of a power loss ONU (Optical Networking Unit) at the homes would cease to function such that without any power backup such systems will cease to function, whether those are RFoG or PON systems, with or without the active combiner disclosed here. The headend optical receiver may only need an input power range from 0.-3 dBm, and require 15 dB less RF output power due to the absence of the RF combiner such that with such a high optical input power and low RF output power requirement the gain can be low.

Embodiments for an RFoG combiner include preventing or eliminating OBI at the combiner as opposed to managing it at the extremities of the network (such as using a CMTS scheduler at the headend side of the network or wavelength specific ONUs at the subscriber end of the network). Embodiments are described that enable elimination of OBI. The disclosed optical combiner may be used to eliminate OBI, enhance capacity, and/or enable multiple services in RFoG, the cable version of FTTH networks. The optical combiners 120, 130 may eliminate OBI, making an OBI-free forever system. The optical combiner 120, 130 may be ONU-independent, CM-independent, and CMTS-independent. The optical combiners 120, 130 enable long reach and large splits, e.g., up to 40 km and 1024 Splits, which will expand even further. The high upstream and downstream capacity enabled by the optical combiner 120, 130 includes up to 10G DS/1G US, and as high as 40G DS/10G US.

While distributed OBI free combining may result from employing a four-port combiner followed by four eight-port combiners and daisy chaining them together, such solution requires power to be provided at five spots (as opposed to power in just one spot with a thirty-two port combiner). The increased need for power is in contrast to the concept of FTTH, which is expected to be more passive and less reliant on powering. An exponential increase in power points is perceived as a reliability weakness in FTTH deployments, increases expenses, may not accommodate currently implemented splitting networks well, and may work well only in greenfield applications where the power system is laid simultaneously with the fiber network.

Disclosed herein are enabling distributed OBI Free combining without the increased need for power required by existing solutions. Disclosed herein are techniques for enabling active combiners to behave as passive combiners, either combiner 120 or combiner 130.

EDFAs such as those in combiners 120, 130 are pumped by an emission wavelength of a laser, conventionally pumped at 1480 nm which is the emission wavelength of a commercially available laser. Disclosed herein are techniques for an OBI free combiner system that pumps the EDFA at a wavelength that causes an active combiner to behave passively.

Figure 2A:
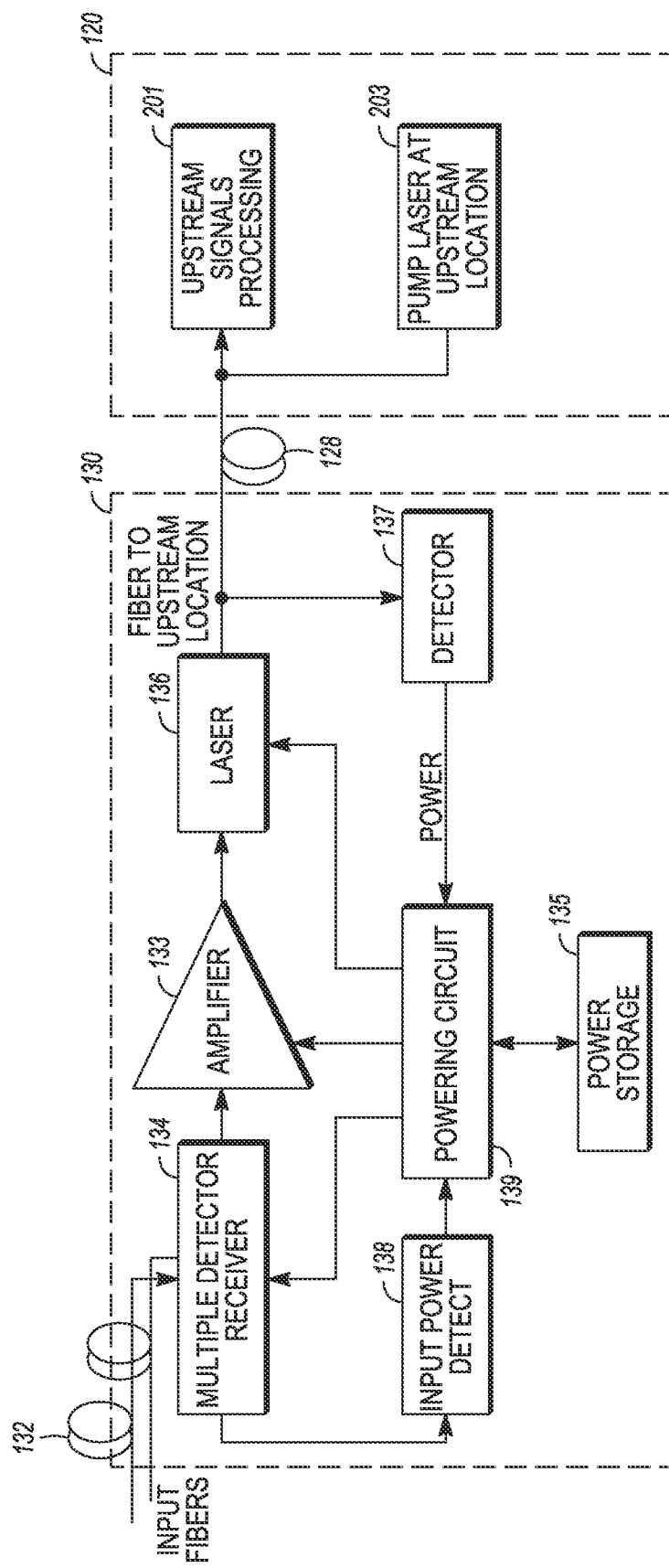
FIG. 2A depicts an optically pumped active combiner system, i.e., an opto-electronic system excited with light, or specifically populating certain electronic levels in a photo-detector to produce a photovoltaic current, similar to how a photocell converts sunlight into electrical power, as disclosed herein.

FIG. 2A depicts an optically pumped active combiner system, i.e., an opto-electronic system excited with light, or specifically populating certain electronic levels in a photodetector to produce a photovoltaic current, similar to how a photocell converts sunlight into electrical power, as disclosed herein. Optical pumping conventionally means to inject light in order to electronically excite the transmission medium or some of its constituents into other energy levels. In the context of lasers or laser amplifiers, optical amplification may be accomplished via stimulated emission for some range of optical frequencies, the width of that range also referred to as the gain bandwidth. Here we also use the term "optical pumping" to describe a system where a "pump" light source induces a photo current through the photo voltaic effect in a detector and the output voltage and current from the detector are used to power electrical circuitry. For example, detector 137 may receive light from a fiber 128 that was injected into the fiber with a "pump" laser at upstream location 120. Detector 128 may put out electrical power to powering circuit 129 that performs necessary voltage conversions to provide power to electrical amplifier 133 for amplifying input signals. Thus with the means of a detector and a powering circuit amplifier 133 may use an optical pump for amplifying electrical input signals.

FIG. 2A depicts upstream signaling between combiners, such as combiners 120 and 130 from FIG. 1. An OBI free combiner, such as the 32 port combiner 120 described in FIG. 1, may be located about 20 km away from the hub, and is powered. The combiner 120 processes upstream signals represented by block 201 (one of skill in the art would recognize the various components that may be used in combiner 120 for upstream signals processing, generalized via block 201). Location 130 as shown in FIG. 2A only illustrates the upstream components (in FIG. 1, both upstream and downstream components are shown, e.g., combiner/splitter 134, an amplifier 133 driving laser 136, a circuit that detects input power 138, a power management circuit 139 optionally with a power storage device 135 and fed by a photo-detector 137 that provides energy to the power management circuit).

FIG. 2A represents an upstream architecture for receiving signals from an optical network unit (ONU), e.g., where the ONU would be to the left of (i.e., located downstream to) combiner 130. The combiner 130 includes an RF detector 134 for detecting whether an RF signal is present at a combiner input or alternatively a circuit 134 for detecting whether optical power is present at least one of the input fibers 132. In embodiments, as shown in FIG. 2A, input fibers 132 may provide signals from multiple ONUs to a multiple detector receiver 134. The multiple detector receiver(s) 134 may provide RF signals to an amplifier 133 that drives a laser 136. Thus, if a signal is detected by an RF detector 134, the RF detector 134 passes the signal through to an amplifier 133. The amplifier 133 amplifies the RF signal including media content that is passed through from the RF detector circuit. The amplified signal drives the laser 136. The laser's output is propagated to combiner 120 on a fiber 128. The laser output is provided via an optical fiber 128 (typically less than 1 km) to an upstream location 120 that further processes the signals.

As described in more detail below, while FIG. 2A depicts an active circuit, such contributing combiners 130 may be remotely located at the edges of the RFoG network and not have access to direct power. For example, the contributing combiner 130 may not have access to electrical power or may need to function in the absence of electrical power. The OBI free combiner 130, located a distance from the hub, may include components that need power to operate, such as an RF amplifier 133 to drive a laser 136 for upstream communication. As disclosed, an upstream location(s) (i.e., upstream from contributing combiner 130) may include a pump laser to drive power to location 130.

As shown in FIG. 2A, the combiner 120 may include a pump laser 203. The pump laser 203 at the upstream location (e.g., in combiner 130) may inject light into fiber 128. The light output from the pump laser 203 may be coupled to fiber 128 that also carries signals downstream from the combiner 120 to combiner 130 (as described above). The light output from the pump may travel over the fiber 128 and is coupled from the fiber 128 to a detector 137 at the combiner 130. The power output from the detector is provided to a powering circuit 139 that powers the input detectors 134, amplifiers 133 and laser 136.

In this context, the powering circuit 139 may employ photovoltaics on the light output from pump laser 203 to convert the optical energy of the light in to direct current electricity, much like a solar cell converts light into electrical power. Thus, in contrast from the optical pumping used for optical amplification in an EDFA, the disclosed fiber power solutions use pump laser light and converts it with the photovoltaic effect (like a PV cell) to electrical power. Thus, while a pump laser puts out optical power, it should be understood that laser 203 may be used as just a laser with a high output power. Such a laser type is commonly used as a "pump laser" in EDFAs hence our reference to the laser 203 as a pump laser. The remote powering via the pump laser disclosed herein is particularly useful where a high amount of power must be delivered to a detector, such as detector 137.

The disclosed techniques for remote powering enable active circuits to behave passively. Remote powered components include components without a local electrical connection for receiving power. For example, active combiner 130 may not have a local electrical connection for power.

Shown in FIG. 2A are the upstream signal combining elements for purposes of illustration, and for simplicity, the downstream architecture is not shown in FIG. 2A. However, the architecture shown in FIG. 2A may include elements for downstream signal distribution as described in FIG. 1. Thus, with reference to the downstream elements shown in FIG. 1 and FIG. 2F below, a pump laser 203 in the active combiner 120 outputs from the first active combiner 120 to one or more downstream location(s) which include a remote powered optical combiner 130, where the first active combiner 120 is an aggregating combiner that may transmit to a plurality of remotely-powered contributing active combiners 130. For example, as shown in more detail below with respect to FIG. 2F, an EDFA 510 may be remotely pumped for enabling downstream signal amplification.

Figure 2B:
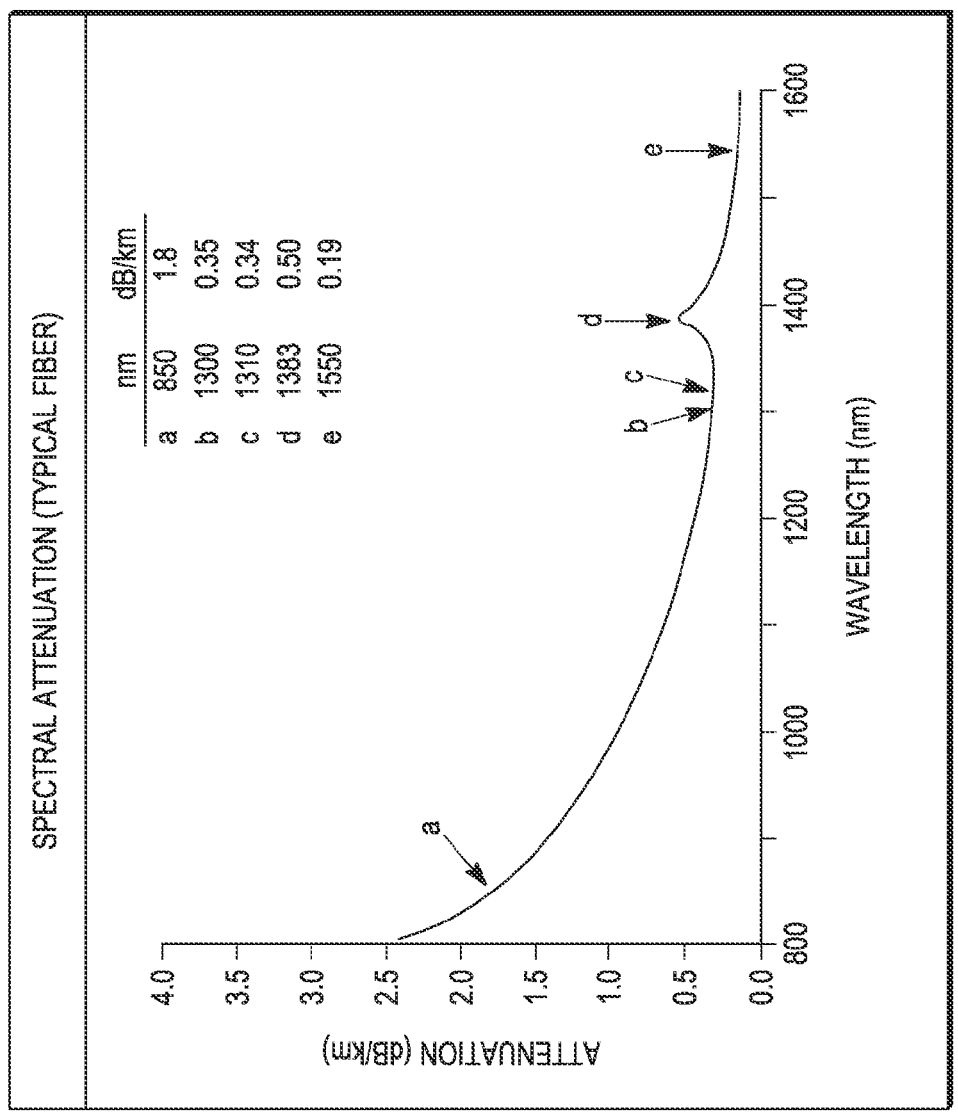
FIGS. 2B and 2C depict performance characteristics of a 980 nm pump.
Figure 2C:
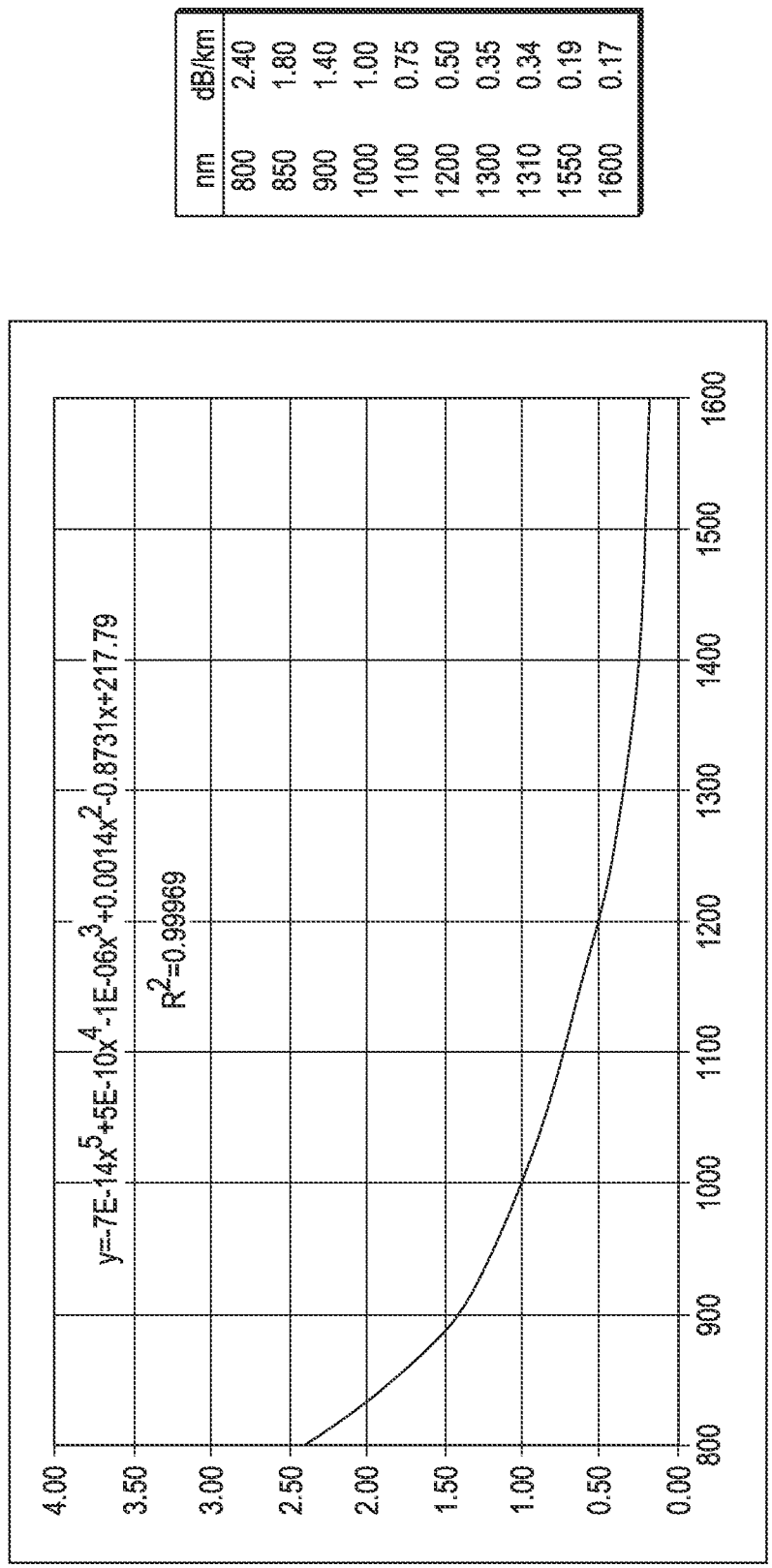

FIGS. 2B and 2C depict performance characteristics of a 980 nm pump. As described above, a pump source including a laser in combiner 120 (e.g., pump laser 203) may provide the pump energy to combiner 130 including RF amplifier 133 at a nominal wavelength of 980 nm to result in an amplified RF signal to drive a laser 136. As shown in more detail in FIG. 2F, a WDM 502 may separate the pump and signal wavelengths.

Figure 2D:
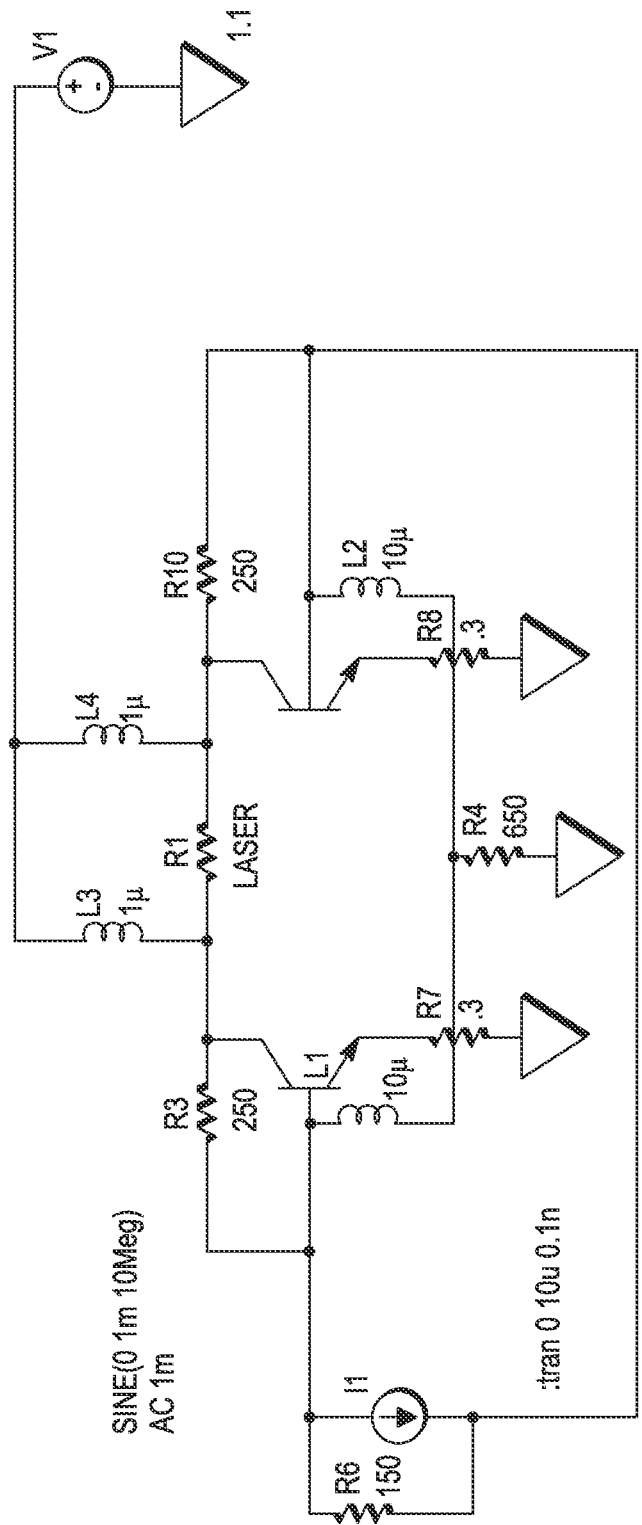
FIG. 2D illustrates an amplifier, such as amplifier 133 in FIG. 1, converting high detector impedance to low laser impedance.
Figure 2E:
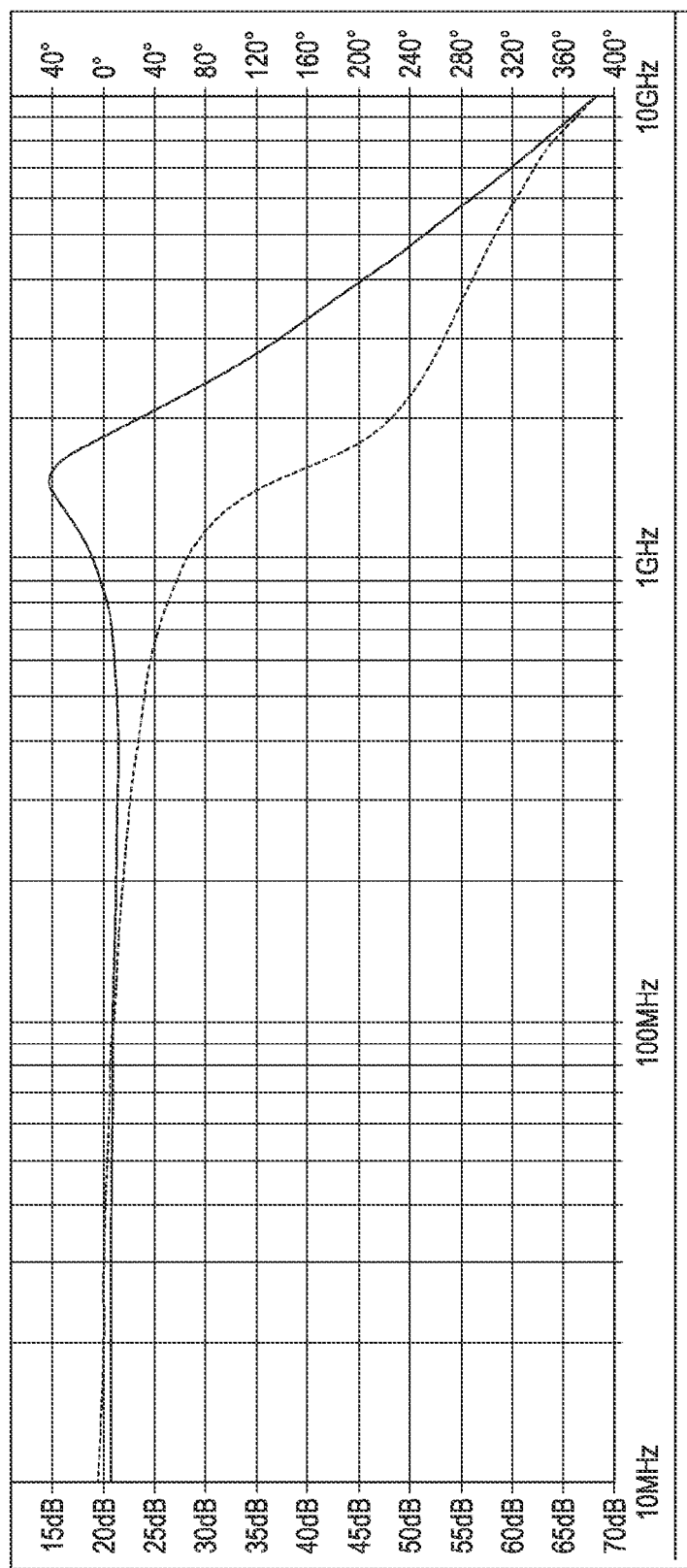
FIG. 2E depicts a bandwidth of impedance transforming a transistor amplifier driving laser with low impedance.
Figure 2F:
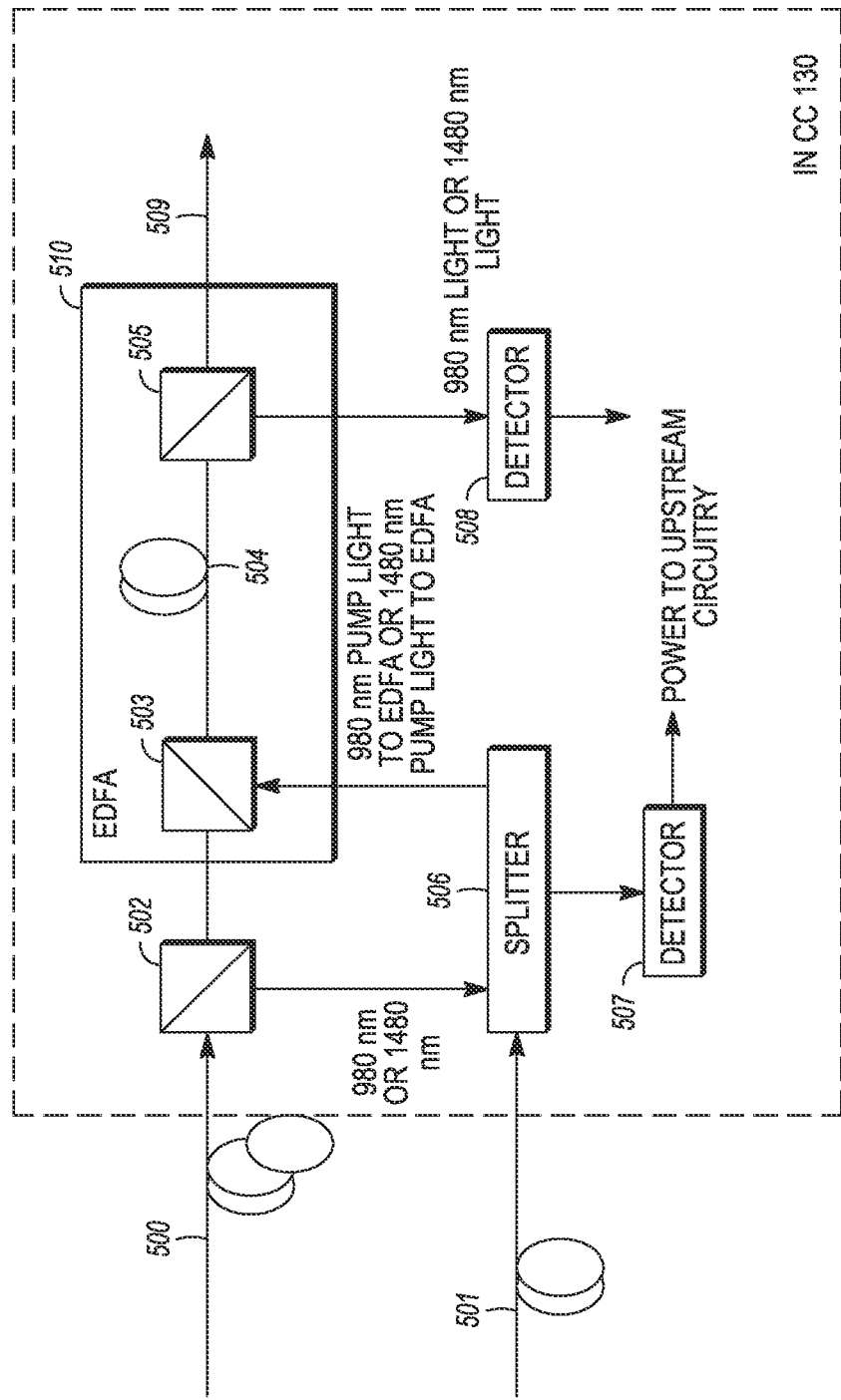
FIG. 2F depicts an example of contributing combiner 130, connected on the left to an aggregating combiner 120.

FIG. 2F further shows options for optically pumping an EDFA 510 using the pump light that will be explained further below. The pump source such as the pump including a laser 203 shown in FIG. 2A may also provide the pump energy to the EDFA 510 in FIG. 2F at a nominal wavelength of 980 nm to result in an amplified downstream signal. As used herein, a pump such as pump 203 is a laser for optical amplification. A pump may be used in an erbium-doped fiber amplifier, as described in embodiments herein. Thus, an incoming downstream signal, often at the nominal carrier wavelength of 1550 nm, may be amplified by an EDFA 510.

In embodiments, a pump laser is located at downstream from the contributing combiner and provides optical power over fiber 501. For example, a pump laser may be located at an ONU location that inputs light in to the contributing combiner 130 via fiber 501. For systems with a separate fiber, such as fiber 501 shown in FIG. 2F, the fiber may be a location located upstream or downstream from the contributing combiner 130 that has an electrical power connection and, thus, is able to provide sufficient optical power to the contributing power for providing remote power.

FIG. 2B depicts the fiber loss across the wavelength spectrum for a standard single mode fiber (with a water peak). FIG. 2B shows the fiber attenuation in dB/km as a function of wavelength. As shown, a 980 nm wavelength has approximately 1 db loss/1 km of fiber (approximately 20% for each km). Over distances of approximately 20 km, such as a distance common between the headend and first optical combiner 120, is a 20 dB loss.

FIG. 2C is a curve fitting of FIG. 2B, but one where the water peak induced loss has been eliminated (this is the case with the newer single mode fibers). FIG. 2C shows a fit to the fiber attenuation as a function of wavelength. The approximate 1 km distance between combiners 120 and 130, therefore, means 1 dB loss, which means a loss of approx. 20% of light. At distances of greater than 3 km of fiber, a corresponding 3 db of loss means 50% of photons are not reaching detection, and the loss over 20 km of fiber using a 980 nm pump would be a significant impairment to the system. Thus, 980 nm pumps are not used in conventional CATV networks for remote fiber powering solutions such as the RFoG networks because of the excessive loss over transmission distances in such RFoG networks. While an EDFA may employ a pump for its amplification purposes, it is noted that this is distinct from the use of the pump laser, e.g., 980 nm pump, as disclosed herein for remote powering purposes.

Referring back to FIG. 2A, in embodiments of the disclosed techniques for optical combining, at least one aggregating combiner 120 is connected to one or more contributing combiners 130 at a proximity for enabling the contributing combiners to behave passively. The active and passive classification is based on whether the combiner configuration includes active electronics (hence have overall gain at RF frequencies), or purely passive components (exhibiting an RF receive loss). Active combiners contain active devices, such as amplifiers, that provide gain. Passive combiners contain no active or nonlinear elements, such as transistors and cannot produce more RF output power than is input to the combiner because they are not provided with remote power for active elements. Generally, passive components are those that cannot supply energy themselves, whereas an active components acts as a source of energy. Active components rely on a source of energy and usually can inject power into a circuit. Passive components can't introduce net energy into the circuit. They also can't rely on a source of power, except for what is available from the (AC) circuit they are connected to. As a consequence they can't amplify (increase the power of a signal).

By behaving passively, the disclosed active combiner 120 is still an active combiner but enabled via remote powering vs. being truly passive. In other words, combiner 130 does include transistors and does have RF gain, but it does not require an electrical power connection because the power required to run it is provided optically via fiber in accordance with the disclosed techniques. Thus, for an installer and operator of the system for all practical purposes, the combiner 130 appears and behaves as if it was a passive combiner, though it is still an active combiner where the electrical power is provided by a photo-detector illuminated by a powerful optical source delivered to the detector via fiber.

In an example implementation, a 4.32 (between 4 and 32 port) port OBI free aggregating combiner (AC) 120 is connected to four or more of eight port contributing combiners (CC) 130 downstream. Disclosed herein are techniques for enabling the contributing combiners with their own power, such that the contributing combiners behave passively in the sense that they do not need a local electrical power connection. Such aggregating combiner and contributing combiners are co-located at a location remote from the hub, where the distance between aggregating combiner 120 and the one or more contributing combiners 130 may be around 1-2 km, whereas over a 1-2 km distance (e.g., the distance between combiners 120 and 130) the loss using a 980 nm pump is approximately 1 dB.

As disclosed herein for techniques for optimizing transmissions over the distances between the headend, the combiners, and the customer premises, 980 nm pumps are implemented with the combiner 130 in embodiments to power the downstream contributing combiners (CC) on the same fiber that downstream signals and the upstream signals traverse. The 980 nm pump used as a pump laser 203 may be the same as a pump used in the EDFAs (e.g., FIG. 1, EDFA 124) at the 4.32 port aggregating combiner (AC) 120 location, but with the distinct purpose as disclosed herein for remote powering the contributing combiner. In other words, the 980 nm pump may extend power to a location that would not otherwise have power, i.e., enabling remote powering of active combiners 130. The pump used in the combiner 120 does not use a pump to produce electrical energy for its own circuitry since it already has an electrical power connection. In some cases, combiner 120 could be receiving remote optical power; however, in such cases combiner 120 would not contain the 980 pump sources to power 130 because they take too much energy, i.e., the pumps require too much energy to drive them off a remote fiber power link; instead they are used to provide power to remote fiber power links.

In this manner, the active combiners 130 may behave passively meaning the active combiner does not require a local electrical power connection, i.e., the active combiners may be remote powered. Such remote powered combiners may be ideal for reducing power requirements where there may be many more combiners 130 in a system than combiners 120 (e.g., for each aggregating combiner 120 there may be 32 contributing combiners 130). Further, remote powering enables an active combiner without a local electrical connection providing power to be powered, and enables the active combiner to behave passively with regards to power, i.e., receiving power remotely instead of actively producing or requiring it. Combiner 120 may likewise be made to behave passively if the distance between the combiner 120 and the component providing optical power to combiner 120 enables use of the 980 nm pump to provide power over fiber.

It is noted that the 980 nm pumps disclosed herein are similar to the laser used to provide pump power for the EDFA, but, unlike the EDFA pumps that require wavelength stabilization for efficient pumping, the 980 nm pump in the combiner 130 need not be wavelength stabilized. Further, because the 980 nm pump may output a large amount of power (e.g., 30 dBM), it may be desirable to SBS mitigate the light. SBS is a well-known effect where optical fiber reflects light above a certain threshold, methods to mitigate SBS include broadening of the spectrum of the light source. The distance over which the 980 nm pump is operating for is modest, (e.g., 1 km between combiners 120 and 130), but even if most light will be received over a modest fiber length, the 980 nm pump in the remotely powered combiner 130 may be SBS suppressed/mitigated to enable even more of the light to be received.

It is to be noted here that in this application, while 980 nm wavelength is described as the preferred fiber power for powering the contributing combiners, other wavelengths such as 850 nm and 1480 nm may also be used. While there are less expensive sources or higher power sources at 850 nm, the fiber loss is higher at the higher power wavelength offsetting some of the advantages. Furthermore, optical components, such as WDMs for single mode operation are much more available for the 980 nm and the 1480 nm sources due to their use in current EDFAs. While the 1480 nm pumps are available with single mode components and have the distinct advantage that the fiber loss is a much more modest than that at 980 nm—the loss at 1480 nm is around 0.25 dB/km compared to the 1 dB/km at 980 nm—the 980 nm wavelength may provide advantages in respect of the fiber power generation by virtue of its lower wavelength and consequent higher energy photons. Furthermore, the 1480 nm may also limit the use of 1490 nm downstream 1G PON wavelength application thus limiting the PON transmission. In case the end user does not anticipate PON operation and reliable efficient fiber power is designed, then the 1480 nm operation would provide longer reach, and all the advantages described for the 980 nm operation described above and to be described below.

Nevertheless, it is to be understood here that while this application describes 980 nm pumping, other wavelengths notably the 850 nm and 1480 nm may be used subject to the discussion above. It is also possible that the 1550 nm signaling transmitter could be co-located within the same module with either the 980 nm or the 1480 nm pumps. For example, in remote CCAP architectures, link length is often shorter between a headed and an aggregating combiner 130. Thus, the 1480 nm pump or the 980 nm pump may be located in the same transmitter module as a 1550 nm signaling laser.

In embodiments for including a 980 nm pump, the 980 nm wavelength has a 1 dB/km of loss. For distributed contributing combiners 130 located within 1 km of the AC (Active Combiner) 120, use of the 980 nm pump therefore results in minimal losses. In embodiments, the 980 nm wavelengths are received by Si detectors, which have a sufficient bandgap to produce power for operating the CCs (Contributing Combiners). As described above, other wavelengths such as 850 nm and 1480 nm may be used subject to the discussion presented.

Contributing combiners 130 may be an 8 port device followed by a retransmitting laser. Since these CCs are very close to the AC, the power of the CC need not be very high. For example −3 dBm or −6 dBm would suffice. Typical power required to run a laser at this power or even up to 3 dBm is around 50 mW or so of power. An AC or a CC may have passive photo diode coupling and therefore not require large power, e.g., approx. 5 mW of power to power photo-detectors and 70 mW to drive the RF amplifier in the CC. A typical economical SM 980 nm pump provides 26 dBm of power; there is a 1 dB loss for a WDM to inject 980 nm light onto the SMF and with a 1 dB loss it reaches the silica detector at 24 dBm of power. With a 50% efficient detector, the released power is 21 dBm, which is around 125 mW, sufficient to run the CC.

In embodiments, the 980 nm WL pump causes no optical non-linear interaction between 980 nm and 1550 nm light in as short a distance as 1 km.

In embodiments, the 980 nm pump is SBS suppressed to enable 22 dBm of power across the SMF. A typical SBS limit is 7 dBm at 20 km and approximately 15 dBm-18 dBm at 1 km of fiber. Thus, in embodiments, a modest modulation on the 980 nm pump enables SBS suppression.

In embodiments, the powering circuit takes a signal from an input power detect circuit connected to the input detectors that flags if optical power is incident to the input detectors. This signal can then be used the control the power provided to the laser and/or the amplifier. Optionally a power storage device such as a capacitor, super-capacitor or battery is coupled to the powering circuit to support powering of the combiner. Note the pump laser may be located at an upstream location as shown but may also be located at a downstream or other location to provide power to the active combiner via an input fiber or separate fiber.

Whereas the figure above shows elements of a typical active combiner used in systems such as that described in FIG. 1 such combiners conventionally need several Watts to power the (already efficient) multiple detector receiver, amplifier and laser. Whereas the laser typically requires just around 1 Volt and under 50 mA of current to operate, equating to around 50 mW of power, the RF amplifiers consume a large amount of power. One main reason is that RF amplifiers are typically designed as gain blocks that operate in systems with characteristic impedance such as 50 or 75 Ohm. Photo detectors on the other hand are high impedance sources and ideally operate at high impedance, limited only by the attainable characteristic impedance of a transmission line if operated with multiple detectors in a transmission line structure. Lasers on the other hand are low impedance devices presenting a load impedance of typically a few ohms to an amplifier.

When taking into account that the fiber length to the active combiner is typically small it becomes clear that the optical input power to the input detectors is significant, typically 1-2 mW inducing 1.2 mA of input detector current that can be provided into an impedance up to a few 100 Ohm resulting in up to around 400 uW of signal power. The laser peak modulation current is on the order of 20 mA with an impedance of a few Ohm or up to around 800 uW of signal power. It becomes clear that not much signal power gain is required to drive the laser; however an impedance transformation is required. Impedance transformation is possible with transformers, however transformers induce losses instead of providing a small amount of gain and it is difficult to obtain a very high impedance transformation ration with a large RF bandwidth. In this application preferably an RF bandwidth of 5-1000 MHz is obtained.

Note that the input detector structure, even if biased at 5 V, only consumes around 10 mW when 2 mA detector current is induced, thus it can be concluded that the RF amplifier is the greatest consumer of optical power. The discussion in the previous paragraph explains that a traditional RF amplifier with high gain and 50 or 75 Ohm input and output impedances is not ideal in this application. This can in part be amended with transformers but these induce additional loss and cause bandwidth imitations. Therefore a different solution is sought after; here a transistor amplifier is primarily used as an impedance transformer that also provides a limited amount of gain.

FIG. 2D illustrates an amplifier, such as amplifier 133 in FIG. 1, converting high detector impedance to low laser impedance. As shown in FIG. 2D, the transistor amplifier may be driven by a source with a high impedance (such as R6 with an impedance of 150 Ohm) and photo-diodes represented by current source I1. The transistors have bias networks L3, L4, L1, L2, R4 to set up a bias current. The input and output impedance of the transistor amplifier is set with feedback resistors R7, R8 and R3, R10. These are set such that the low laser impedance R1 of a few Ohm is converted to an impedance close to R6 at the input to the transistor amplifier. Note that due to the low laser impedance the signal voltage swing at the laser is very small; as a consequence a supply voltage to the amplifier as low as 1 V is sufficient to operate the amplifier. The amplifier current required is on the same order as the laser current (around 50 mA) to obtain acceptable distortion performance.

Semiconductor lasers operating in the 1310-1610 nm range can operate with a voltage drop in the 0.9-1.5 Volt range; this means that the voltage source required to operate the laser could also provide the power required to operate such an amplifier. As a consequence the entire circuit to operate photo-detectors, amplifier and semiconductor laser could operate on one low current voltage source to bias the detectors and one low voltage source to operate both the laser and the amplifier. In some cases the required detector bias could also be as low as 1 V (but not typically) so that a single low voltage supply may be sufficient.

FIG. 2E depicts a bandwidth of impedance transforming a transistor amplifier driving laser with low impedance. As illustrated, bandwidth obtained is high, on the order of 1000 MHz.

In general the laser impedance at 1 GHz is affected by parasitic inductance of a laser package. This parasitic inductance affects the impedance transformation by the transistor amplifier and can be mitigated by adding appropriate inductance to feedback resistance to resistors R3 and R10. This was included in the calculation shown above.

As described in more detail below, aspects of ONU designs with laser on/off control and RF gain on/off control apply to the combiners described above, and can additionally be used to save power and prevent turn-on and clipping related errors.

FIG. 2F depicts an example of contributing combiner 130, connected on the left to an aggregating combiner 120. A fiber 500 provides downstream signals and pump laser power at 980 nm to an EDFA 510. This power may be passed directly to the EDFA or coupled to a splitter 506 using WDM component 502 that selectively couples all or part of the 980 nm pump light to that splitter. Splitter 506 provides all or part of the power into splitter 506 to detector 507 that provides power to the upstream circuitry. Remaining power from splitter 506 is provided to WDM component 503 that couples power to the Er doped fiber section 504 in EDFA 510. At the output of EDFA 520 a WDM component 505 couples remaining 980 nm pump light to an optional detector 508 that can also be used to provide power to upstream circuitry and the WDM component 505 to prevent leakage of pump light from the EDFA to output 509. Each and any of these implementations may be chosen provided that power is provided both to the upstream circuitry and an EDFA in CC 130.

Note that FIG. 2F only illustrates 980 nm pump light distribution and not other components in CC130 used to combine and split other optical signals. Also note that alternatively 1480 nm may be used to provide power to both EDFA and upstream circuitry. Finally note that in case 1480 nm is used then wavelengths longer than 1480 nm, such as 1550 nm and 1610 nm can be amplified by the Raman gain effect on a fiber preceding the CC. Preferably 1550 nm is used in the downstream and 1610 in the upstream direction to and from the CC respectively. If a 1480 nm pump is used with sufficient power then the Raman gain effect on the fiber preceding the CC can provide enough gain (for instance greater than 1 dB) so that the Er doped fiber section of the CC is not required.

Figure 2G:
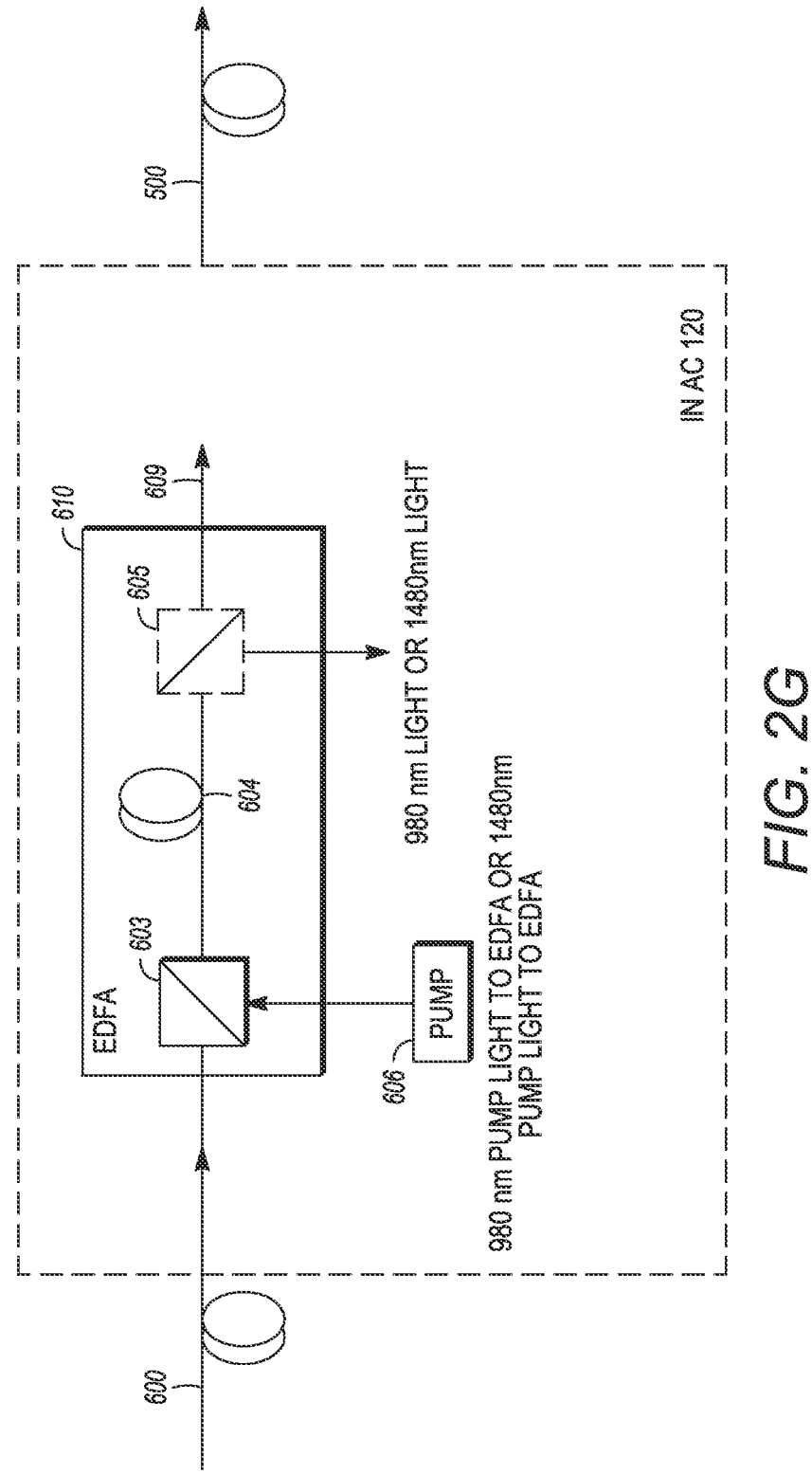
FIG. 2G depicts an example EDFA in AC 120, where the WDM filter 605 at the output of the EDFA is constructed such that 980 nm light is permitted to leak to EDFA output 609 and this light is used to remotely power a downstream CC 130.

FIG. 2G depicts an example EDFA in AC 120, where the WDM filter 605 at the output of the EDFA is constructed such that 980 nm light is permitted to leak to EDFA output 609 and this light is used to remotely power a downstream CC 130. The EDFA has a pump laser 606 that is coupled towards the Er doped fiber 604 using WDM coupler 603. This means that coupler 605 that is conventionally present in an EDFA to reject remaining 980 nm pump light may be absent in the EDFA. This figure only illustrates 980 nm light distribution and not the other components used for RF signal handling; the output fiber 500 from AC 120 to CC 130 will be coupled to output 609 such that 980 nm is passed to fiber 500.

Described above, it is noted that while 980 nm may be used for fiber power in the upstream, the 980 nm may also be used for remote pumping the downstream EDFA. For example, if the system uses an EDFA (e.g., EDFA 510 in contributing combiner 130 shown in FIG. 2F), then the 980 nm may enter that EDFA 510 directly through the input or even without an input isolator to get to the Er-doped section. Then, at the end of the Er-doped section the remaining pump light can be dumped to the detector that powers the upstream. The 980 nm may be used for remote pumping the downstream EDFA510 using just one fiber or multiple fibers. For example, one fiber may be used for sending upstream and downstream signals, a second fiber may be used for fiber power to power upstream signal processing circuitry, and a third fiber for remote pump power to pump an EDFA for downstream signal amplification. Thus with 3 or more fibers, a fully functional totally passively behaving contributing combiner having DS amplification and US OBI Free operation is possible. Often when fiber is laid in the access extremity, additional strands are also laid and are readily available. However, the above use of the 980 nm pump may also be employed with a single fiber.

If only one fiber is utilized, a high power 980 nm pump in the aggregating combiner is WDMed into the signal fiber, e.g., fiber 128, that extends to one or more contributing combiners 130, connecting combiners 120, 130 via the single fiber and thereby coupling the 980 nm pump to a receiver or a detector in the contributing combiner 130. A portion of the power may then be sent to the Si or InGasP receiver and converted to electrons. However the remaining portion is sent directly to the passive EDFA and is used to amplify the downstream signal. Details of this are illustrated in FIGS. 2F and 2G.

Use of the 980 nm as disclosed herein enables a completely remote powered operation for the DS and US operation of the contributing combiner 130. The innovative combination of fiber power and remote pumping is unavailable in conventional systems that do not contemplate the aggregating and contributing combiner concepts. Further, the option to use either single fiber or multiple fiber operation depending upon the pump power availability, cost, and fiber availability, is made available using the disclosed techniques. As described above 1480 nm may also be used in case the end user does not intend to use 1490 nm PON. Under proper design, 1480 nm pumps may allow for a longer reach to the contributing combiners.

In embodiments, the disclosed optical combiner prevents interference in RFOG deployments in the combiner rather than preventing interference using measures taken in the ONU where previous attempts have failed or proven to be cost-prohibitive.

Figure 3:
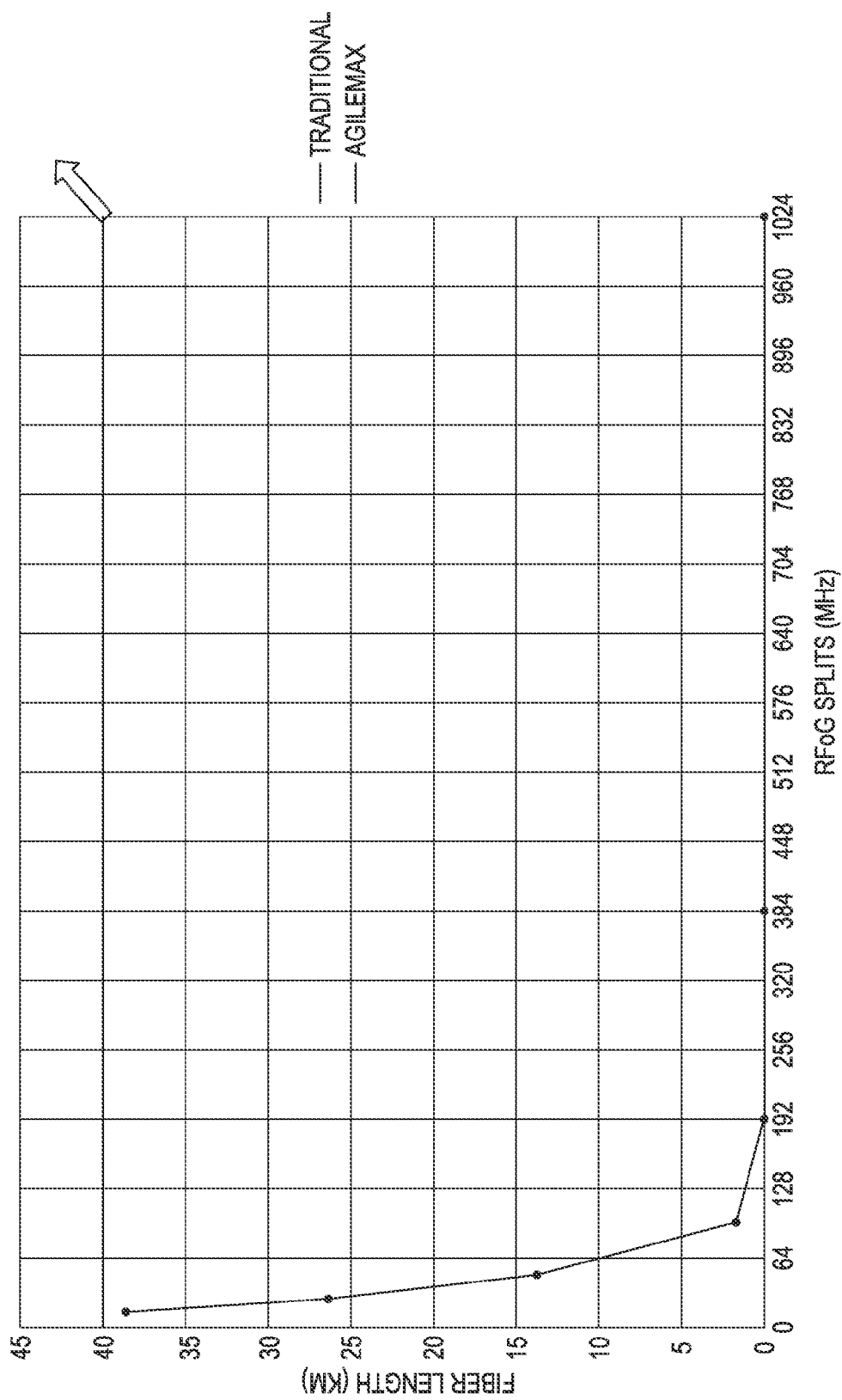
FIG. 3 depicts a comparison of fiber length vs. the number of RFoG splits for an RFoG architecture.

Traditional RFoG architectures have a fixed power budget. This means that as fiber length between the head end and the ONUs increases, a smaller number of splits may be used, as can be seen in FIG. 3. Conversely, the more splits that are desired, the less fiber length may be deployed. The disclosed active architecture, however, enables fiber length of up to approximately 40 km irrespective of the number of splits used, meaning that the disclosed active architecture permits fiber lengths of 40 km or more along with a large number of splits, e.g. 1024, thereby advancing FTTP topology and deployment.

The overall cost of the active splitter architecture shown in FIG. 2 is similar to that of a traditional RFoG solution. The cost of active splitter EDFA gain blocks and WDM and detector components in the active architecture is offset by the elimination of head end gear such as receivers, high power EDFAs and combiners. A cost reduction of the ONUs that can operate with lower output power further supports the active splitter architecture. Further advantages of the active splitter architecture may include a reduction in outgoing fiber count from the head end, which can have a large impact on system cost, as well as an option to use 1310 nm reverse ONUs while staying within a typical SNR loss budget, which can further reduce costs. Also, the system shown in FIG. 2 exhibits increased bandwidth relative to what existing RFOG architectures are capable of providing, avoiding limits on service group sizes and concomitant requirements for more CMTS return ports. Finally, unlike OBI mitigation techniques in existing RFoG architectures, the system shown in FIG. 2 does not require cooled or temperature controlled optics and bi-directional communication links that necessitate additional ONU intelligence.

Each of these factors provides a further cost advantage of an active splitter solution over existing RFoG architectures. Required space and power in the head end is also reduced; the active splitter solution requires one transmit port, one receive port and one WDM component. Existing RFoG architectures, on the other hand, requires transmit ports, multi-port high power EDFAs, 32 WDM's, 32 receiver ports, and a 32-port RF combiner. Existing RFoG architectures require very low noise, high gain, and output power receivers with squelch methods implemented to overcome power loss and noise addition in the RF combiner. The system 100 shown in FIG. 2, conversely, works with input power normally in the 0-3 dBm range, little gain is required, and requires 15 dB less power output due to the absence of the RF combiner before the CMTS.

The disclosed optical combiner unit may be independent of ONUs Cable Modems and CMTSs. The disclosed optical combiner may be CMTS agnostic, thus relieving the burden of creating an RFoG aware scheduler that is both restrictive and time consuming. The optical combiner assists to make a cable version of FTTH more feasible, as compared to the Passive Optical Network (PON) alternatives. For example, the disclosed optical combiner unit may have a reciprocal PON pass-thru capability of the optical combiner unit along with a high upstream and downstream capacity, which assists RFoG deployment without interruption to the underlying system or later PON deployment on an RFoG system.

Preferably, the disclosed optical combiner unit implements a transmission line approach to combine multiple optical photodetectors in a single optical receiver. This may be accomplished in configurations with unidirectional or bidirectional communication. A unidirectional system provides no control communication signals from an active optical splitter to an ONU, i.e. control communication signals only pass from an ONU to an active splitter. Thus, in a unidirectional system, an active optical splitter simply accepts an output level from an ONU and operates with that output level. A bidirectional system passes control signals from an active optical splitter to ONUs instructing them to adjust their output power; this type of system permits accurate equalization of the input levels to the active optical splitter from each ONU.

Some active splitter/combiner systems may preferably include redundancy where active optical splitters switch their return laser power (the return laser that carries the combined information of the ONUs connected to it) between a high and a low power state or operates this laser in CW mode. In that case an upstream head end or active optical splitter can easily detect loss of power at an input port and enable a second input port connected to another fiber route to receive the information, in the forward path the other fiber route would also be activated in this case because generally the forward and reverse light share the same fiber. Also, some active splitter/combiner systems may include a reverse laser in the active optical splitter that adjusts its power output as a function of the number of ONUs transmitter to the active optical splitter and the photocurrent received from these ONUs. Still other active splitter/combiner systems may have a gain factor and reverse laser power of the active optical splitter set to a fixed value.

Preferably, the disclosed optical combiner unit is able to configure itself under changing circumstances. Instances occur in which cable modems in the ONU are required to communicate with the CMTS even if there is no data to be transmitted. Usually, however, the ONU is turned off during periods when there is no data to be transmitted between the ONU and CMTS, and a cable modem could go hours before receiving or sending data. Thus, in some embodiments the disclosed combiner unit may be configured to stay in communication with the CMTS. Cable modems may be required to communicate back to the CMTS once every 30 seconds, or some other appropriate interval.

ONU Operational Modes and Laser Clipping Prevention

In traditional RFoG architectures, ONUs transmit information in bursts and at any point in time one or more ONUs can power on and begin transmitting information. As required by the DOCSIS specification, all ONUs are polled repeatedly with an interval up to 5 minutes but usually less. When an ONU turns on, the optical power transmitted by the ONU rises from zero to the nominal output power in a short time. As a consequence, the optical power received by the active splitter from that ONU goes through that same transition. The slew rate with which the ONU can turn on is constrained by the DOCSIS specification, but the transition is still relatively abrupt, resembling a step function. As is well known from signal theory, a step function has a frequency spectrum that contains significant energy in the low frequencies, with declining energy as frequency rises. If the low frequency energy were allowed to be re-transmitted unimpeded by the active splitter laser when retransmitting signals, then the signal could readily overdrive the laser and cause laser clipping. To avoid such clipping, several approaches may be utilized.

First, a steep high pass filter may be implemented after the detectors of the active splitter, which ensures that the low frequency signals induced in the photo detectors from ONUs that power on and off do not overdrive the laser used for retransmission. Such a high pass filter should be constructed such that it presents a low impedance to the photo detectors for low frequencies such that the photo detectors do not see a significant bias fluctuation when ONUs turn on and off. For instance if a coupling capacitor were used as the first element in a filter that presents a high impedance to the photo-detectors then an ONU that turns on could result in a significant bias fluctuation of the photo detectors, so such a type of filter should not be used. In this context, a significant bias fluctuation would be a fluctuation of greater than 10%. Preferably, the high pass filter is configured to limit fluctuations to levels well below this figure, e.g., 5% or even 2%. Also, if the re-transmitting laser is also used in burst mode, then the slew rate of the retransmitting laser should preferably be limited when it turns on, so as to limit the amount of low frequency spectrum into the photo-detectors of preceding active splitter units.

As noted above, ONUs normally operate in burst mode and this causes the associated problems just described. Burst mode operation of the ONUs is required in an existing RFoG architecture because otherwise, the probability of OBI occurrence would be very high and the system would not generally work. With the active splitter architecture, however, OBI cannot occur and the signal to noise margin is much higher than with RFoG. Because of this, a second approach to reducing clipping is to operate ONUs in a continuous "on" state with the active architecture previously described. For 32 ONUs delivering signals into an active splitter, the shot noise and laser noise accumulates, but the signal to noise budget is so high that the resulting SNR performance is still much better relative to existing RFoG systems. As a consequence, the active splitter architecture allows operation of all connected ONUs simultaneously given that the active splitter architecture eliminates OBI.

Figure 4:
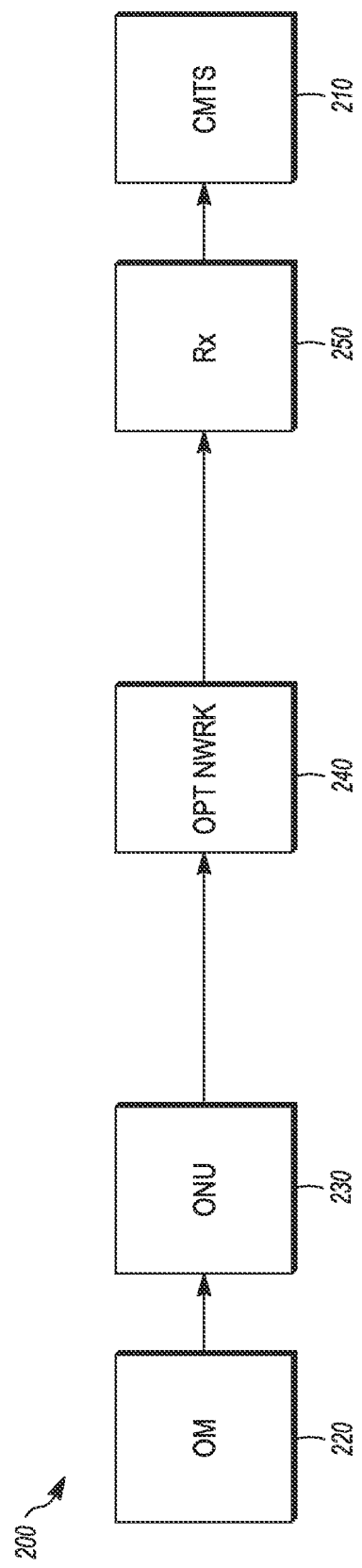
Referring to FIG. 4, in a traditional RFoG system 200 the CMTS 210 keeps the RF level at a return input port constant.

A third option to alleviate laser clipping is to allow the ONUs to operate in burst mode, but to detect the amount of power out of the ONU and attenuate the ONU's signal so as to prevent clipping. Referring to FIG. 4, in a traditional RFoG system 200 the CMTS 210 keeps the RF level at a return input port constant. The return signal is generated by a cable modem 220, provided to an ONU 230 that includes an optical reverse transmitter and relayed over an optical network 240 to a receiver 250 co-located with the CMTS that converts the optical signal back to an RF signal and provides that to the CMTS 210. It should be understood that the optical network 240 can contain active and passive elements. It should also be understood that the communication between the cable modem 220 and the CMTS 210 is bidirectional, i.e. there are both "forward" and "reverse" path signals.

The communication path shown in FIG. 4 is used to adjust the output level of the cable modem. In case the loss from the ONU 230 to the receiver 250 is high, or the loss from receiver 250 to the CMTS 210 is high, then the CMTS 210 will adjust the output level of the cable modem 220 to a high level in order to obtain a set input level at the CMTS or a level within a predefined range at the CMTS. In traditional RFoG systems there is considerable margin on the input level that the ONU can handle, to allow for this adjustment. However, it is still possible for the cable modem to overdrive the ONU 230, particularly as the amount of spectrum used by the cable modem increases to support future heavy data loads. When the ONU 230 is over-driven, then the RF signal modulated onto the laser of the ONU 230 becomes so high that the reverse laser in the ONU 230 is driven into clipping, i.e. the output power from the laser swings so low that the laser is turned off. This causes severe signal distortions and creates a wide spectrum of frequencies that interferes with communication throughout that spectrum.

The optical network typically combines signals from multiple ONUs, each ONU is typically communicating in another band of the frequency spectrum. The communication of all of these ONUs is affected by the wide spectrum induced by the distortions even if only one ONU is clipping. Preferably this problem is resolved in such a way that the other ONUs are not affected, the clipping ONU is brought to a state where it can still communicate and the CMTS produces a warning that an ONU is not operating optimally.

A variation on the third option just described is to operate ONUs in burst mode where the ONU switches between a low power state (for instance −6 dBm) and a high power state (for instance 0 dBm). This means that the ONU laser never fully turns off, i.e. the laser always operates above its laser threshold, and can always be monitored by the active splitter. The reduction in output power when it is not transmitting RF signals reduces the shot and laser noise accumulated in the active splitter such that the signal to noise impact is minimized.

In circumstances where the optical combiner unit cycles to a low power state rather than a completely off state, the photodiode current and a max/min can be tracked for photodiode current across all of the ports of the combiner, and thus a microcontroller can be used at the optical combiner to continuously track the max and min in a specified time interval. For example, if for ten minutes the photodiode current max is 0, then the optical combiner determines that the cable modem is either not connected, has a defective optical link, or is otherwise defective. Optionally the active optical combiner can signal absence of photo-current to a head end. The optical combiner is also able to configure itself whether or not the optical combiner can determine if light received is bursty, as in normal RFoG operation, or CW (continuous wave) as with a node reverse transmitter. The optical combiner is able to know by using CMTS upstream signaling imposed by the CMTS onto the modems to analyze which ports are working, which ports are silent, which input ports are connected to ONUs, and which input ports are connected to optical combiner reverse transmitters, where optical combiner ports may have an output power profile different from ONUs in the sense that the power may be CW or may be fluctuating between a low and a high power state or may carry information embedded in the signaling indicating the presence of a further optical combiner between the ONU and the optical combiner.

For cascaded active splitters, the return lasers in cascaded active splitters can similarly be operated in conventional burst mode where the laser turns off between bursts, in CW mode, or in a burst mode that switches between a high and a low power state. It should also be understood that CW operation of reverse lasers and/or ONUs, or burst mode operation with a low and a high level further facilitates determination of the optical input levels into the upstream input ports of active splitters. It should also be understood that, although the devices and methods disclosed in the present application that prevent or otherwise reduce clipping by a laser operating in burst mode was described in the context of an ONU, the devices and methods used to prevent clipping by a laser in an ONU are equally applicable to preventing clipping by a laser in an active splitter as previously disclosed.

Figure 5:
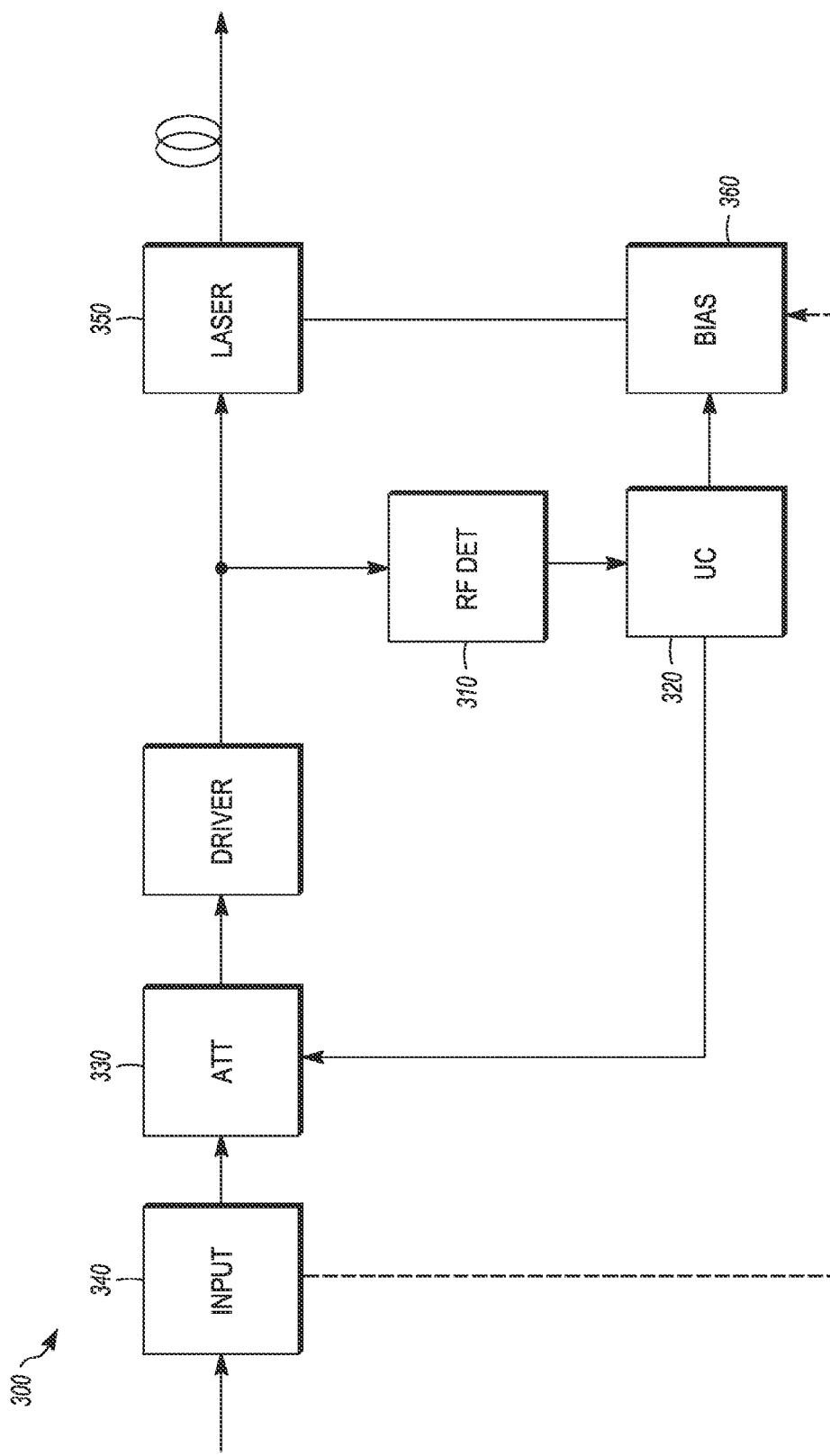
FIG. 5 shows a system that mitigates laser clipping that might otherwise result from burst mode communications from an ONU.

FIG. 5 shows a system that mitigates laser clipping that might otherwise result from burst mode communications from an ONU. Specifically, an ONU 300 may include an RF rms detector 310, a microcontroller 320 and an algorithm to adjust an attenuator 330 in the ONU as a result of the power detected at the RF rms detector 310. The reverse path from the ONU 300 may be operated in burst mode; when an RF signal is presented to the input 340 then the ONU's laser 350 is turned on by the bias circuit 360. This can be accomplished either by an additional RF detector 315 in the input circuit directly turning on the bias circuit (dashed arrow) or by the RF detector 310 and the microcontroller 320 turning on the bias and setting the bias level. When a burst occurs, the RF detector 310 measures a power level and provides that to the microcontroller 320. The microcontroller also is aware of the operating current of the laser 350 as set by the bias circuit 360. Thus, the microcontroller 320 can compute if the RF signal level is large enough to induce clipping of the reverse laser. If no clipping will occur, no further action needs to be taken and the ONU 300 can retain a nominal RF attenuation value. If, at that time, the ONU is not at a nominal RF attenuation value the procedure is more complicated, this will be discussed later in the specification.

If clipping will occur, the microcontroller 320 stores the event. If a specified number of clipping events has been counted within a specified time interval, then the microcontroller 320 determines that the ONU 300 is having significant performance degradation due to clipping, and is also significantly impairing other ONUs in the system. In that case, the microcontroller 320 computes how much the RF attenuation needs to be increased to eliminate the clipping using RF power measurements that have been previously recorded. The microcontroller 320 then increases the RF attenuation to a new value such that the laser 350 is modulated more strongly than normal (more modulation index than the nominal value), but still below clipping. The microcontroller 320 may optionally also increase the laser bias setting to provide more headroom for laser modulation.

Because attenuation of the signal from the ONU 300 has been increased, the RF level as seen by the CMTS at the end of the link drops. The CMTS will then attempt to instruct the cable modem to increase the output level to restore the desired input level for the CMTS. This may result in either of two scenarios. First, the cable modem may not be able to further increase output level and the CMTS will list the cable modem as a problem unit that is not able to attain the desired input level to the CMTS. This does not mean that the CMTS can no longer receive signals from the cable modem, as the CMTS has a wide input range to accept signals. Hence, the reverse path still generally functions whereas it would have been severely impaired had the clipping problem not been resolved. Second, the cable modem may have more headroom, in which case the CMTS will instruct it to increase its output level and restore the CMTS input level to the desired value. As a consequence, the reverse laser will be driven into clipping again and the ONU microcontroller will further increase the RF attenuation. This cycle will continue until the cable modem has reached its maximum output capability and then the system is back to the first scenario.

The system shown in FIG. 5 provides protection from clipping by ONUs, and also causes the CMTS to be aware of problem modems or ONUs. As was previously noted, the root cause of the problem was that the loss from ONU to CMTS was too large, due for example to a bad fiber connection in the optical network from ONU to the receiver. This problem is signaled, and eventually will be fixed. When the problem is fixed however, the CMTS input level increases beyond the preferred CMTS input level and then the CMTS will direct the cable modem to reduce output level. If the ONU is not at the nominal attenuation value and notices that the actual modulation index is at or below the nominal level then this can be recognized as different from the previous "new value" for ONUs that had been overdriven that was deliberately set above the nominal modulation index. This implies that the problem in the system has been fixed and the microcontroller can reduce the attenuation down to the nominal value, gradually or in one step. Thus, this technique automatically recovers from the state where it protects the ONU from clipping with increased attenuation to nominal attenuation once the system has been fixed.

As previously indicated, an ONU takes time to turn on after a burst has been detected. For example, the RFoG specification indicates that the turn-on time of an ONU should be between 100 ns thru 1000 ns (i.e. 1 µs). A turn-on time that is too fast undesirably creates a very high low frequency noise, which decreases as frequency increases. Unfortunately, because this noise extends to around 50 MHz or beyond, most of the currently deployable upstream signals are propagated within the frequency range that is affected by noise due to an abrupt turn-on time. Exacerbating the signal degradation is the fact that the noise is spiky, in that the instantaneous noise burst could be much higher than what is commonly seen on a spectrum analyzer with moderate video bandwidth.

Figure 6:
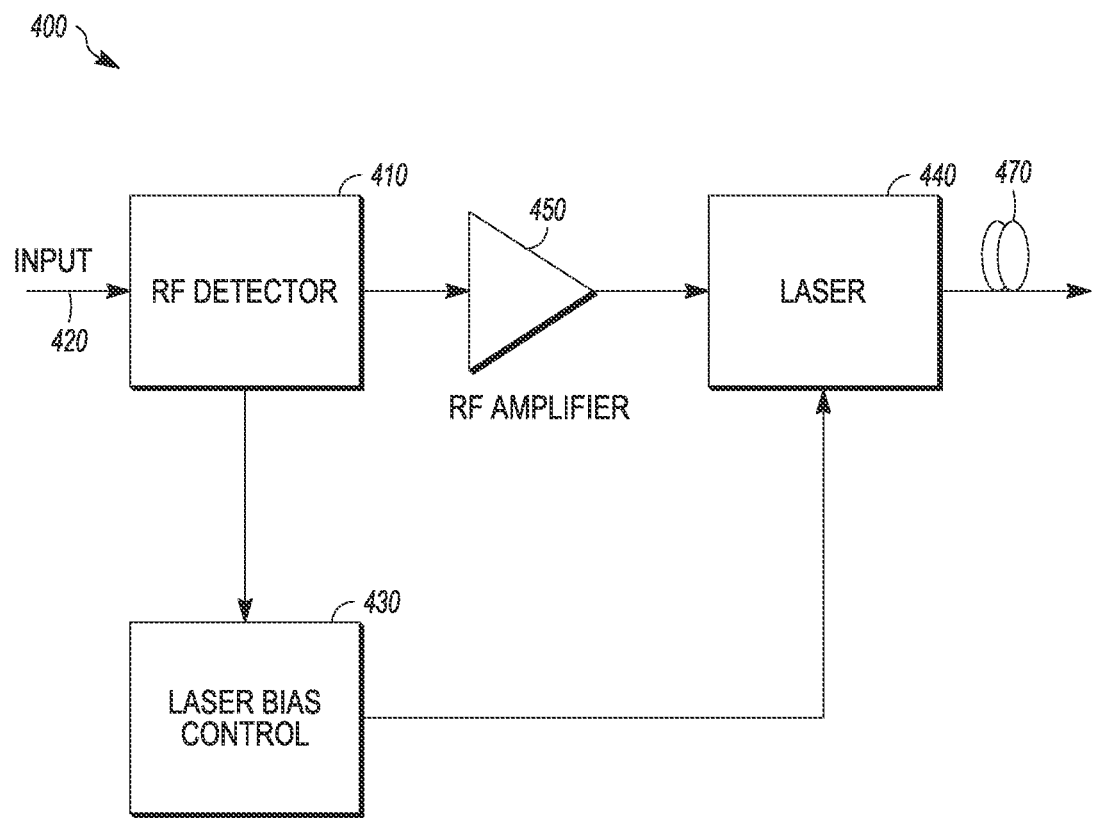
FIG. 6 shows a second improved ONU that mitigates clipping.
Figure 6:
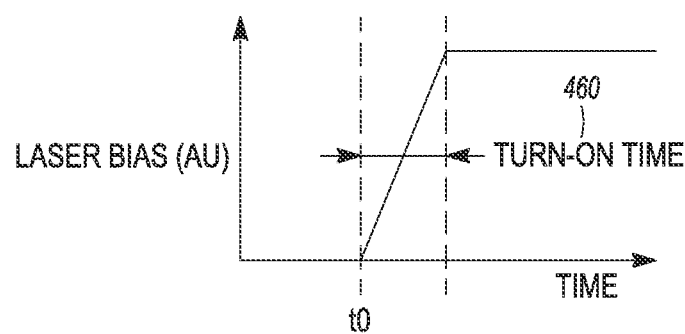

FIG. 6 generally illustrates an ONU upstream architecture 400 where an RF detector 410 detects whether an RF signal is present at its input 420. If a signal is detected, the RF detector 410 passes the signal through to an amplifier 450 and also signals a laser bias control module 430 to turn on at time t0 a laser 440, which has a turn-on time 460. The amplifier 450 amplifies the RF signal that is passed through from the RF detector circuit 410. The amplified signal drives the laser 440. The laser's output is propagated from the ONU on a fiber 470. For simplicity, the downstream ONU receiver architecture is not shown in FIG. 6. The turn-on time 460 of the laser has a profound effect on the spectrum produced by the turn-on event.

Figure 7:
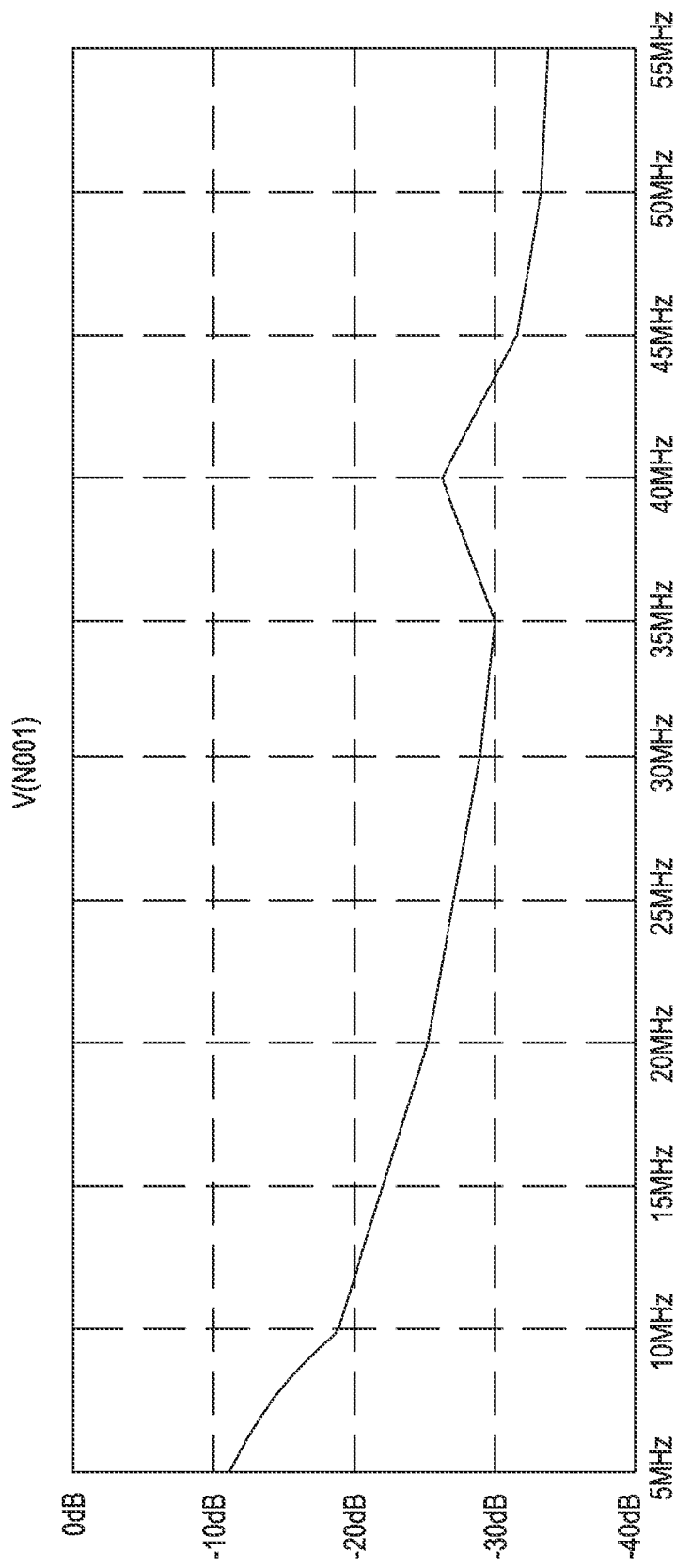
FIG. 7 shows an ONU output spectrum having a rise time of 100 ns.
Figure 8:
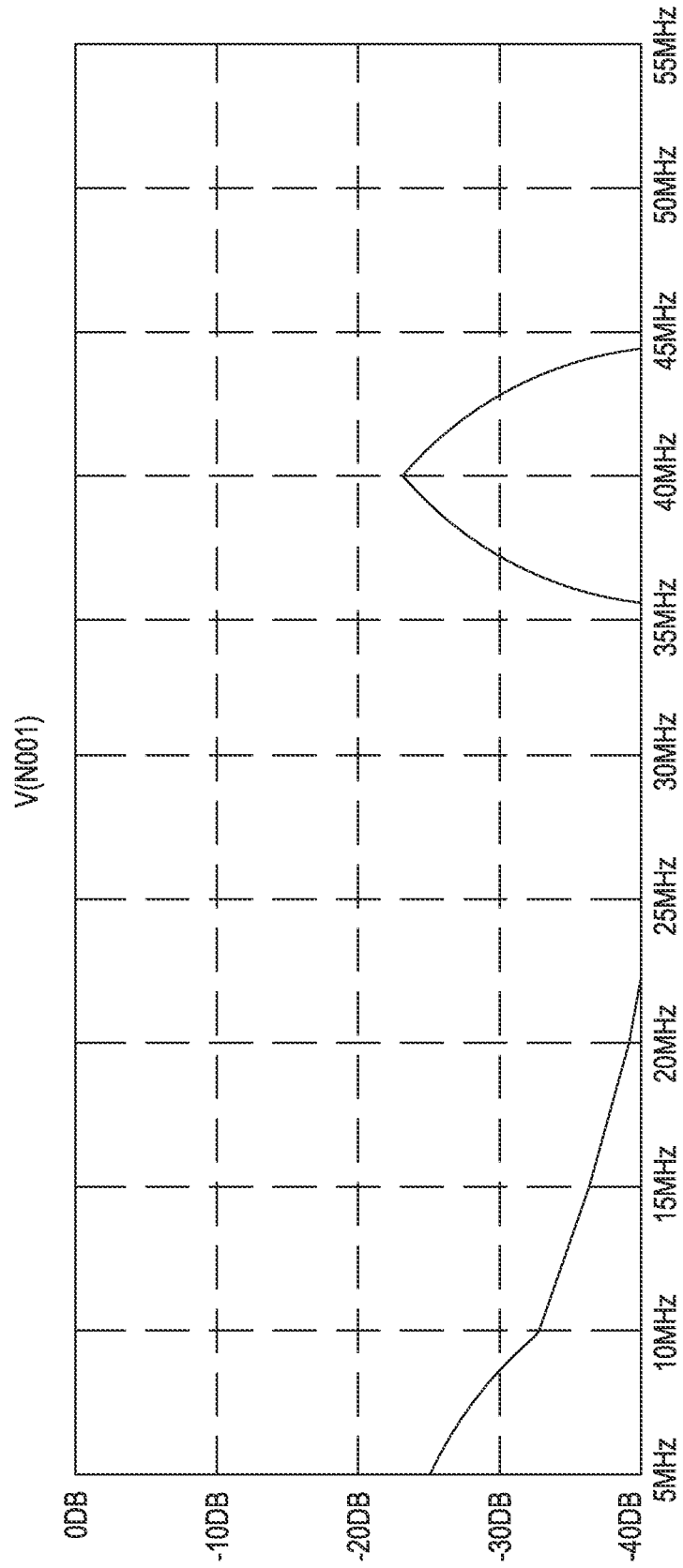
FIG. 8 shows an ONU output spectrum having a rise time of 1000 ns.

FIGS. 7 and 8 show estimated spectra for a rise time of 100 ns and 1 µs, respectively, for a typical signal at 40 MHz. For a short rise time, the noise due to the ONU turn-on is of the same order of magnitude as the intended signal. With a slower laser turn on this effect can be mitigated.

If there is just one ONU on at any given point in time, the effect of low frequency noise due to ONU turn-on is negligible, because the DOCSIS load is inset after the laser has fully turned on. However, when there are multiple ONUs that can turn on at any given time, then the noise is often not negligible. If there was a first ONU on and a second ONU turns on while the first one is transmitting data, then the spikes in high noise, described above, are present across a wide range of the frequency spectrum of the upstream signal. Depending upon the relative RF levels of the signals and the magnitude of the noise spikes, the signal may experience pre- or even post-forward error correction (FEC) errors, when measured at the CMTS for example. The potential for debilitating noise becomes more and more pronounced as the numbers of ONUs that can turn on increases, as is likely to happen as architectures migrate to the DOCSIS 3.1 standard. While this problem has always existed, it only becomes apparent, as a residual error floor, when the OBI and its induced errors are eliminated.

An additional impairment is caused by the application of the RF signal before the laser has fully turned on and has stabilized. Specifically, an impairment can occur for example if the laser turn-on time is slower than the DOCSIS Preamble which may be applied before the laser has reached steady state. Typically, the DOCSIS Preamble is sent as a QPSK signal and can often be 6 to 10 dB higher than the regular RF signal that follows, depending upon signal conditions. In such an instance, the laser will be over-driven while still in a low power state and experience very large clipping events that may cause spikes in noise throughout the RF spectrum of the upstream signal, and thus hide other signals that may exist at the same time. As previously indicated, while this effect has always occurred, it only becomes observable with the elimination of the OBI, and its attendant OBI-induced errors.

Figure 9:
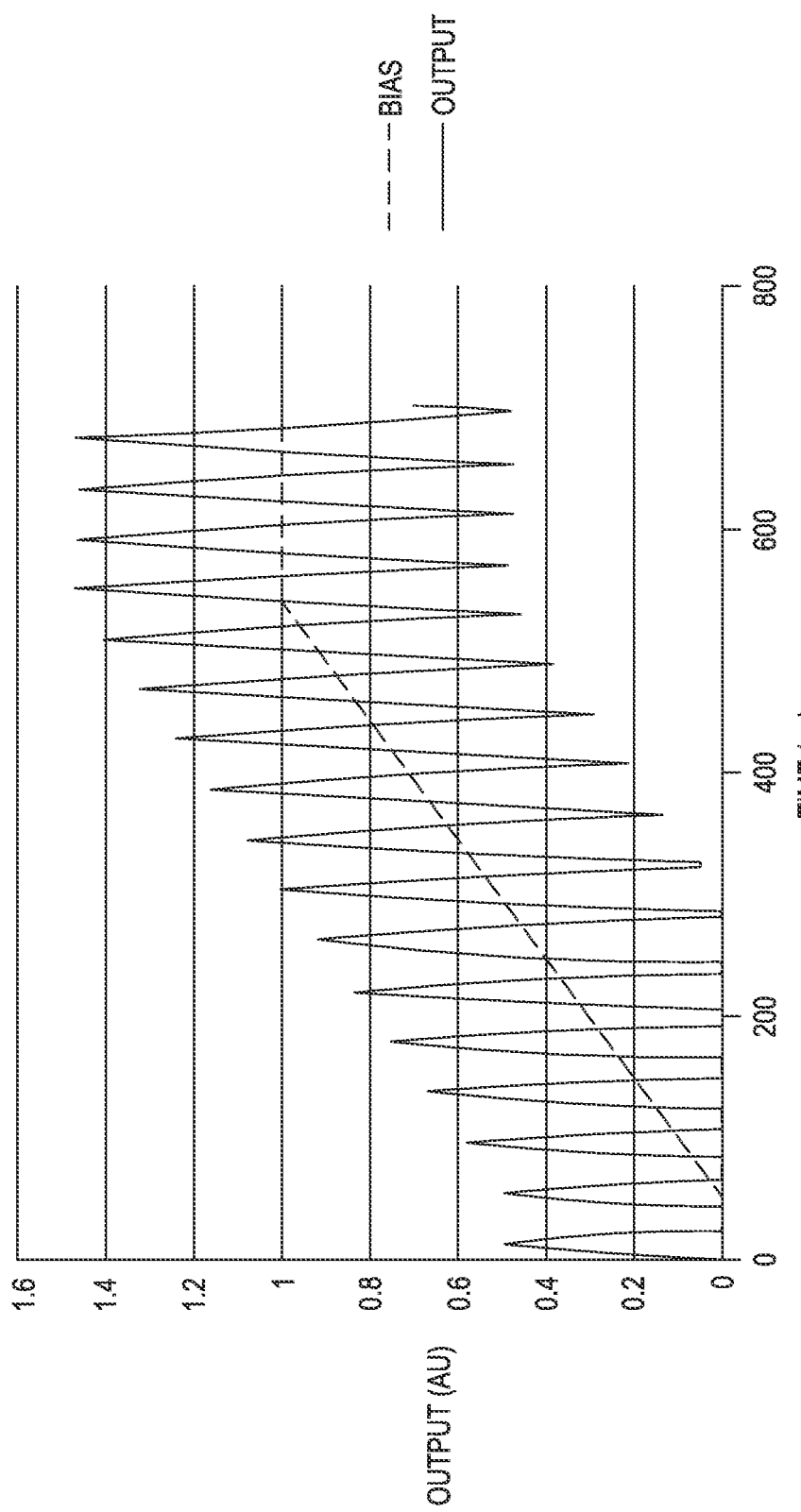
FIG. 9 shows a response time of an ONU to an RF signal.

FIG. 9 shows a bias, around which a laser is modulated with a sine wave signal. During the time that the laser bias is insufficient, the output signal is clipped. For slower laser turn-on, the duration of the clipping is increased. While it may be desirable to reduce the low frequency RF spikes that occur across the upstream frequency spectrum by having a slower turn-on time, the increase in clipping described above may counteract the benefit of the slow turn-on time. Disclosed are novel techniques that permit a slow turn-on time while avoiding clipping artifacts.

Figure 10:
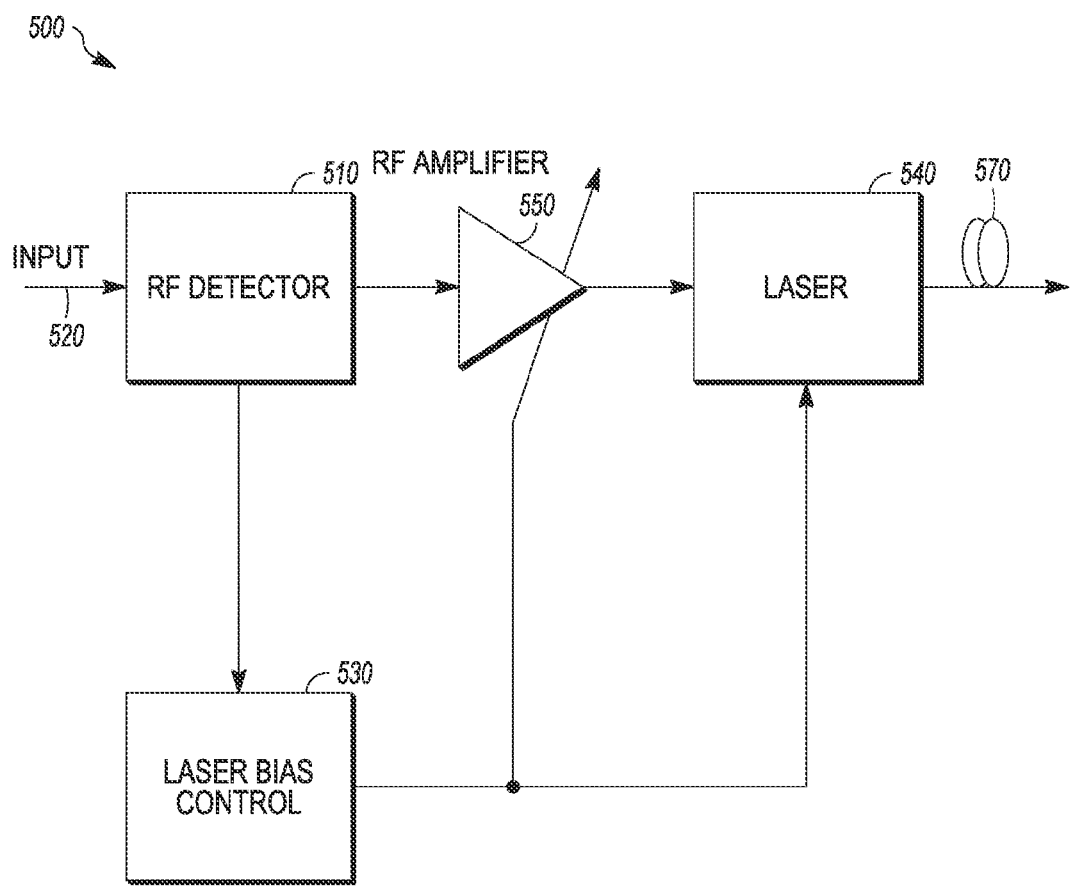
FIG. 10 shows an ONU having a laser bias and RF amplifier gain control.
Figure 10:
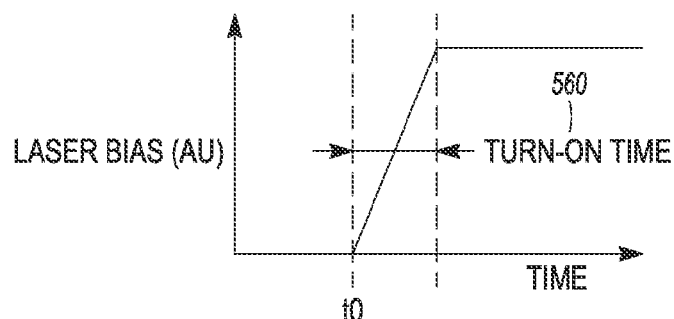

Referring to FIG. 10, a novel ONU upstream architecture 500 includes an RF detector 510 that detects whether an RF signal is present at its input 520. If a signal is detected, the RF detector 510 passes the signal through to an amplifier 550 and also signals a laser bias control module 530 to turn on at time t0 a laser 540, which has a turn-on time 560. The laser bias control module 530 preferably modulates the bias of the laser 540 to achieve a full turn-on of the laser 540 over a turn-on time 560 that is preferably as slow as possible, e.g. the slowest turn-on time allowed by the RFoG standard, or in some embodiment even longer. In some embodiments, the turn-on time of the laser 540 could be up to 500 ns, 1 µs, or longer. This may greatly reduce the low frequency noise. The turn-on time for the laser may be linear, as shown in FIG. 10, or may implement a transition along any other desired curve, such as a polynomial curve, an exponential curve, a logarithmic curve, or any other desired response.

The amplifier 550 amplifies the RF signal that is passed through from the RF detector circuit 510. The amplified signal drives the laser 540. Preferably, when amplifying the RF signal from the RF detector 510, the laser bias control module 530 includes a circuit that modulates the amplifier gain to be proportional to the laser bias. This effectively sets the gain of the amplifier 550 to be proportional to the laser turn-on 560, and thereby reducing or even preventing over shoot and clipping by the laser 540. The laser's output is then propagated from the ONU on a fiber 570.

Figure 11:
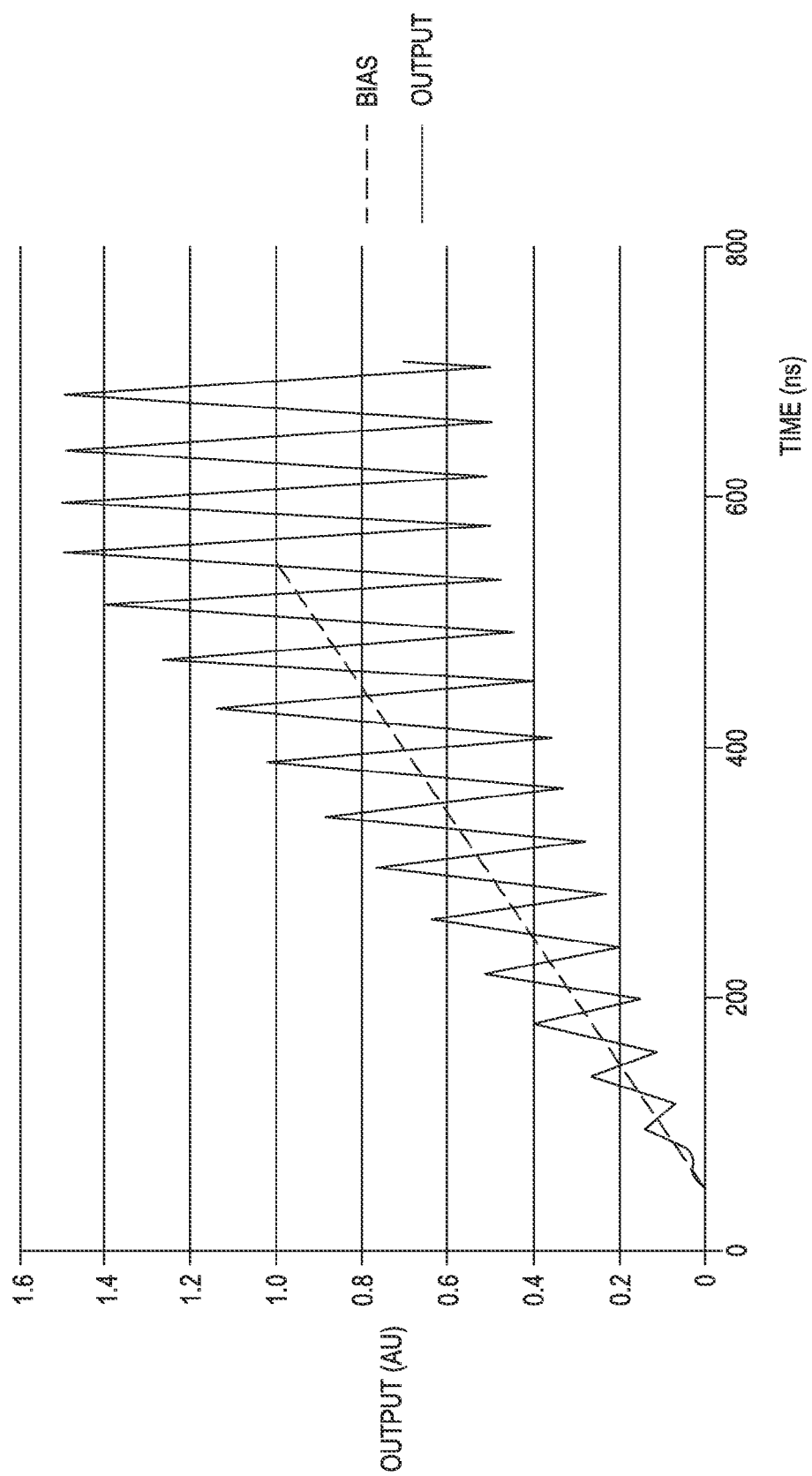
FIG. 11 shows the response time of an ONU with RF gain control in proportion to laser bias control.
Figure 12:
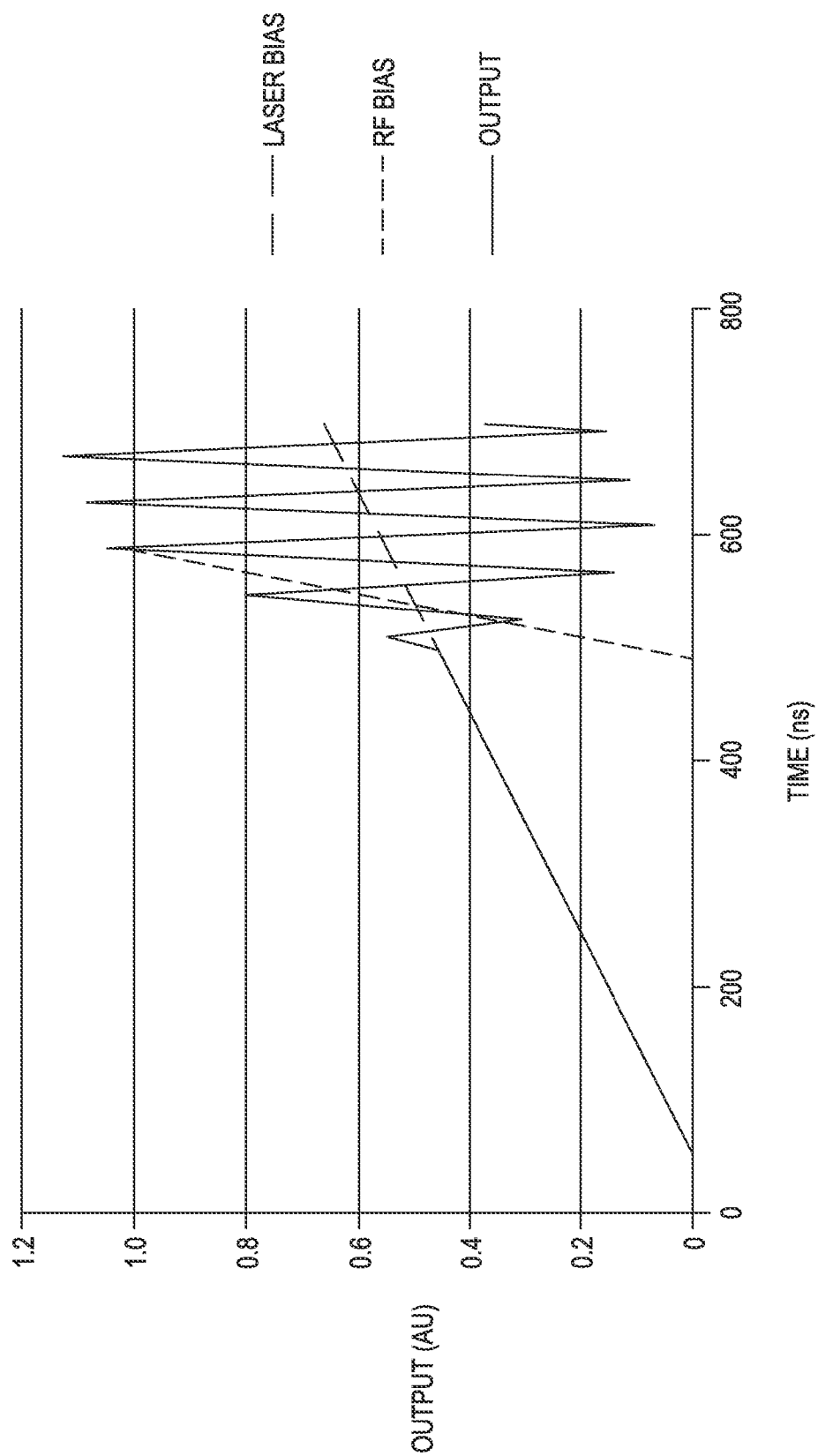
FIG. 12 shows the response time of an ONU where the RF gain control is delayed with respect to the laser bias control.

FIG. 11 shows the output of the laser 540 when using the system of FIG. 10. As seen in this figure, when using an RF gain factor proportional to the laser bias, the clipping no longer occurs. However, the variation in RF level during the laser turn-on may potentially cause an issue in the burst receiver that may expect a near constant RF level during the laser turn-on. To mitigate this, in some embodiments, the amplifier bias may be modulated to delay the RF signal to the laser, relative to the turn-on time of the laser 540, and may also apply a faster time constant than the optical power turn on. This embodiment is illustrated in FIG. 12.

Figure 13:
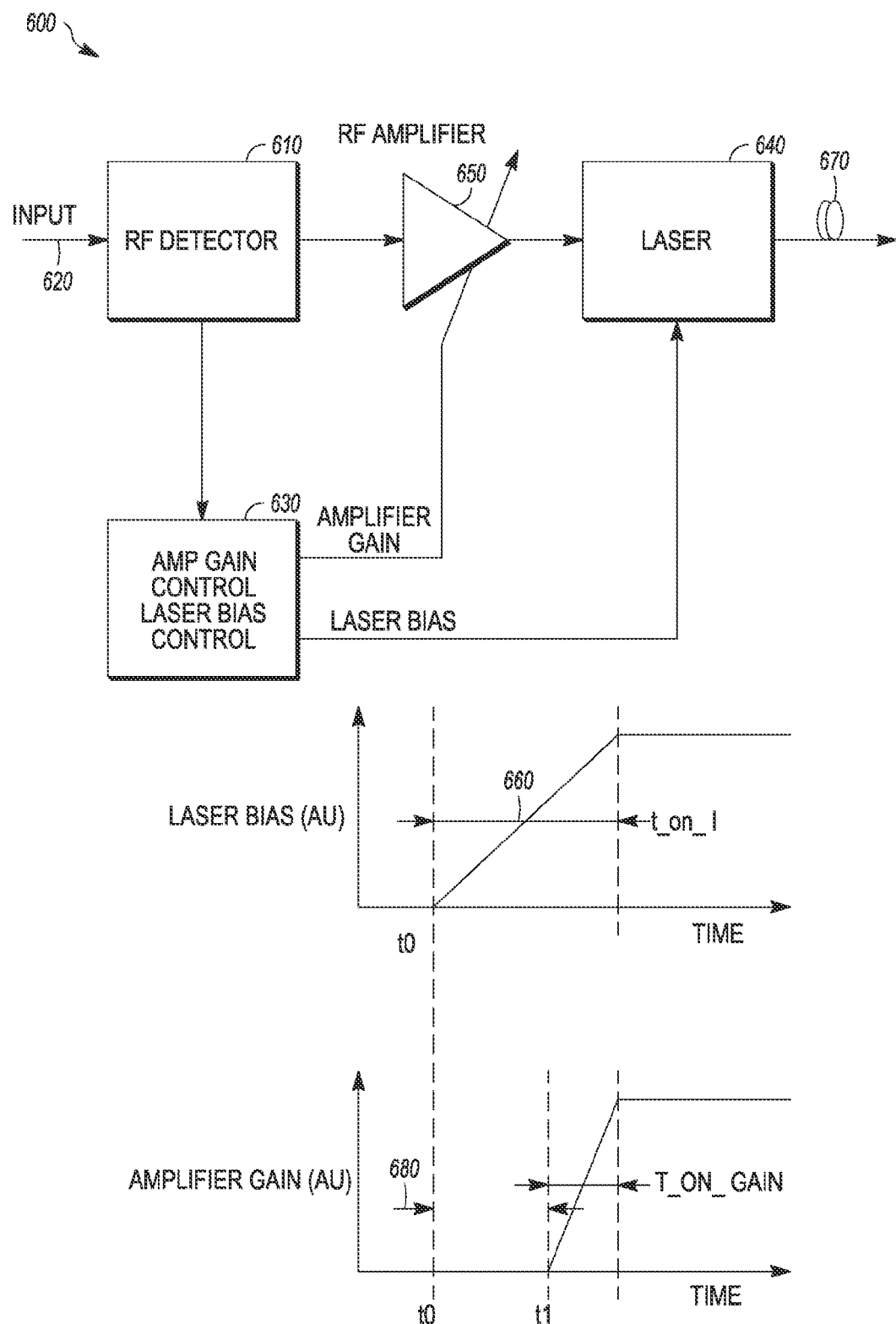
FIG. 13 shows an ONU having a separate amplifier gain and laser bias control.

FIG. 13 shows an implementation of an ONU that includes a delay in the RF signal to the laser, relative to the turn-on time of the laser, and also applies a faster time constant than the optical power turn-on. Specifically, a novel ONU upstream architecture 600 includes an RF detector 610 that detects whether an RF signal is present at its input 620. If a signal is detected, the RF detector 610 passes the signal through to an amplifier 650 and also signals a laser/amplifier bias control module 630 to turn on at time t0 a laser 640, which has a turn-on time 660. The laser/amplifier bias control module 630 preferably modulates the bias of the laser 640 to achieve a full turn-on of the laser 640 over a turn-on time 660 that is preferably as slow as possible, e.g. the slowest turn-on time allowed by the RFoG standard, or in some embodiment even longer. In some embodiments, the turn-on time of the laser 640 could be up to 500 ns, 1 µs, or longer. This may greatly reduce the low frequency noise. The turn-on time for the laser may be linear, as shown in FIG. 13, or may implement a transition along any other desired curve, such as a polynomial curve, an exponential curve, a logarithmic curve, or any other desired response.

The amplifier 650 amplifies the RF signal that is passed through from the RF detector circuit 610. The amplified signal drives the laser 640. Preferably, when amplifying the RF signal from the RF detector 610, the laser/amplifier bias control module 630 includes a circuit that modulates the amplifier gain to be proportional to the laser bias, but with a delay 680 relative to the time t0 that the laser 640 begins to turn on. Preferably, the rise time of the amplifier gain is faster than the rise time of the laser turn-on. In some embodiments, the laser/amplifier bias control module 630 simply switches on the RF gain, i.e. the rise time is as short as the amplifier allows. The laser's output is then propagated from the ONU on a fiber 670.

This ONU shown in FIG. 13 effectively sets the gain of the amplifier 650 to be proportional to the laser turn-on 660, and thereby reducing or even preventing over shoot and clipping by the laser 640, while at the same time mitigating problems caused by a receiver expecting a near-constant RF level during the time that the laser turns on. The ability to simultaneously reduce the laser turn-on time and to provide an RF gain to the laser in proportion to the laser turn-on time, but delayed with respect to the laser turn-on time is a feature that has great potential in all applications, and without loss of generality these techniques may be used for any analog application such as DOCSIS 3.0 or 3.1.

Figure 14:
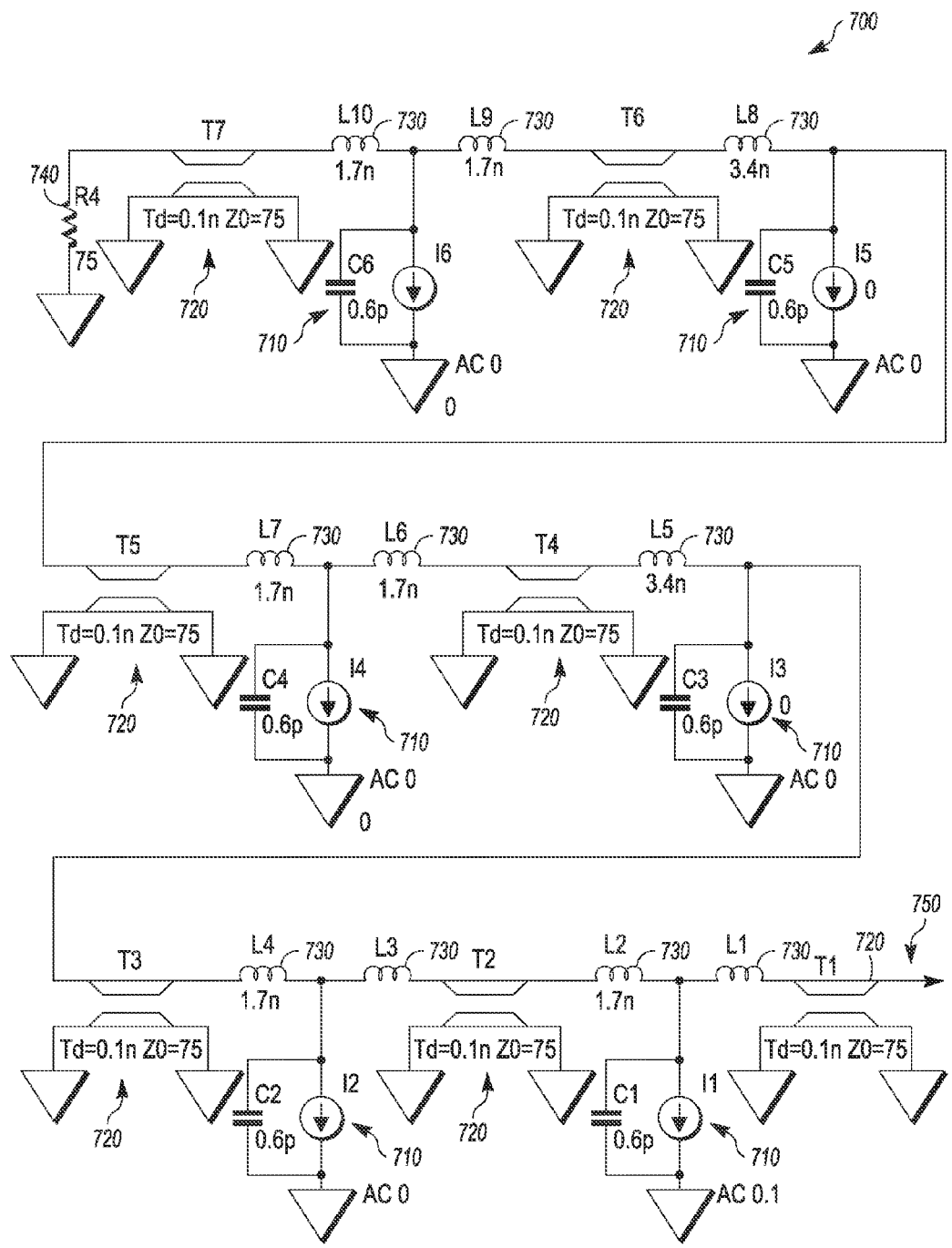
FIG. 14 shows a transmission line receiver structure.

Either (or both) of the architectures shown in FIGS. 10 and 14 may be used together with the architecture shown in FIG. 2 so as to further improve speed and stability of HFC systems. These may further be used together with the long term clipping reduction discussed in the previous disclosure to reduce the effects of both long term and short term clipping in the system.

Burst Detection

As indicated earlier, upstream transmissions typically operate in burst-mode (BM), where ONUs power up a transmitter, e.g. a laser, only during time intervals when information is to be transmitted along the upstream path. A burst-mode system generally provides a lower noise environment and thus enables better SNR, and in the case the transmitter is an optical device, the use of burst-mode tends to reduce Optical Beat Interference (OBI). Thus, in some preferred embodiments of the optical combiner system previously disclosed in this specification, where OBI is to be suppressed, such optical combiners are preferably operated in burst mode.

Also as indicated earlier, RFoG architectures that use burst-mode detect the RF level in the ONU, powering the ONU's laser when an RF signal is detected and powering down the laser when the RF signal is not present. This procedure is referred to as "RF detection." In an optical combiner, the optical light inputs coming from the ONUs are all detected and the detector outputs are collected. If RF detection is used with an optical combiner, an RF comparator would be applied to the output of the combined RF output. If the RF level output of the combined RF detectors were higher than the applied comparator, then the optical laser in the optical combiner would be activated.

However, such detection may be fraught with difficulties because the RF level input could be very small. For instance, a very small slice of a D3.1 signal could be produced by any single ONU, hence the modulation index of the ONU would be low, resulting in a low RF level at the optical combiner. Also, optical input power to the optical combiner from a given ONU could be low; with an optical input range spanning up to 12 dB, the RF level after detection could vary by 24 dB. As a result, the RF level from a photodiode could still be so low that this RF level that is to be detected would be lower than the comparator, even if the RF level were high relative to the Optical Modulation Index of the ONU laser that generated the RF signal. In ONU embodiments, the RF level could be turned on after the optical output is turned on, or while the optical output is being turned on, such that the detection of an RF level at the disclosed optical combiner would be delayed. Furthermore the detection could also be slow, because it depends upon the comparator circuit.

An alternative to using burst detection on the cascaded optical combiner units disclosed in the present application would be to keep the upstream light transmission on all the time, irrespective of whether signals are provided to the optical combiner or not, i.e. an "always on optical combiner". Though this would ensures that the optical combiner transparently relays information upstream, however this would result in a constant light input at all the ports at an upstream optical combiner device or multiple port receiver. The total light input at the ports thus could lead to a summation of shot noise from all the ports, degrading the SNR performance of the total system. For this reason, in preferred embodiments, the optical combiner unit transmits upstream light only when an RF signal has been received and is to be sent out.

Disclosed herein is a novel method of burst detection that is fast, simple, stable and robust thus enabling multiple new architectures. Specifically, broadly stated, the disclosed optical combiner system may monitor the optical current of each photo diode as well as the sum current of all photodiodes. If any one of the photo diodes registers a photo current, or alternatively a current above a certain minimum value, the retransmitting laser is automatically turned on. The photodiode current generation is instantaneous and beneficially is a DC value that is easier to compare. As speeds of the interconnecting networks increase over time, such optical detection circuits will become more useful.

Such an Optical Burst Mode (OBM) detector promotes reliability and may have the following advantages: (1) in the case of multiple daisy chained optical combiners as disclosed in the present application, substantial reduction in the additive shot noise is achieved relative to an "always on" solution; (2) in the case of DOCSIS 3.1 transmission, individual signal transmissions with very low RF levels per ONU may be detected and retransmitted; and (3) in the case of varying optical input levels due to different optical lengths between the ONUs and the disclosed active optical combiner, or varying optical lengths between multiple daisy chained such active optical combiners, reliable burst mode operation may still be achieved.

Furthermore, the disclosed novel burst detection also enables detection of light at the input immediately at the start of a burst at the optical combiner input. Conversely, where there is no light at the input, or alternatively no light for a certain period of time, the ancillary RF amplifiers in the disclosed active optical combiner may be powered down, thus reducing the power dissipation of the disclosed active optical combiner. When light appears at the input of the disclosed active optical combiner, the amplifiers can be powered on again within the time allowed; for instance in an RFoG system up to one microsecond is allowed to establish an optical link from the moment that the RF input is detected and the system has started to turn on. Because RF amplifiers take a finite time to turn on and establish amplification; early detection of a burst is important to provide enough time to establish normal operation. Such power cycling could reduce power dissipation by as much as ten times, thus drastically improving the critical infrastructure metrics. Thus, for example in the event of a power outage, the optical combiner can conserve the power required by not only using optical burst operation, but also RF circuitry burst operation and extending a battery's life, if available.

Implementation of an optical power detection circuit capable of covering a wide range of optical input power, in an architecture having multiple detectors is not trivial. Given the large number of detectors present, combined with a wide optical input power range, the amount and range of photocurrent that needs to be reliably detected is considerable. Simply measuring the voltage drop across a resistor in the detector bias network is difficult; at low input power on a single detector, a small voltage drop can be reliably detected only if the value of a resistor, across which is a voltage drop equal to the photodetector bias, is relatively high. However, increasing the value of such a resistor is not desirable because this leads to an increased voltage drop when high detector currents are present at multiple detectors; the detector bias would become a strong function of the optical light present at the detectors. In some embodiments, the detector bias is held constant because detector responsivity depends on detector bias; thus a varying the detector bias could lead to a variation in the gain of the system. Even a resistance value as low as a typical transmission line impedance, such as 75 Ohms, can be problematic when a large number of detectors are active, and for instance 100 mA of detector current flows in the multiple detector system, leading to an excessive drop in detector bias.

Disclosed is a method to detect optical light over a wide input power range while retaining a constant bias on the detectors present in the transmission line receiver. In order to accomplish this, a combination of both an RF amplifier and a trans-impedance amplifier are used with the multiple detector structure. In some embodiments, the trans-impedance amplifier is connected to a high-pass structure in front of the RF amplifier such that for low frequencies the trans-impedance amplifier has a very low impedance connection (less than the transmission line impedance) to the detector bias.

Referring to FIG. 14, which shows an example of a transmission line receiver structure 700, a photo-detector may accurately modeled up to fairly high frequencies (~1 GHz) by a capacitance in parallel with a current source for reasonable input power levels (>1 uW). Thus, in this figure, each of the circuit elements 710 would be a model of a photodetector. Conventional receiver designs use a trans-impedance amplifier or match the detector to as high an impedance as possible, so as to convert the current source signal to an RF signal with the best possible noise performance. Such approaches are limited by the detector capacitance such that an increase in the number of detectors or detector area leads to a loss of detector performance, and therefore a large number of detectors (e.g. 32) cannot reasonably be expected to work well. This implies that multiple amplifiers are needed to receive a large number of fibers.

A transmission line with impedance Z can be modeled by a ladder network of inductors and capacitors with $L/C=Z^2$, which works well for frequencies under the resonance frequency of L and C. Practical detector capacitance values are on the order of 0.6 pF, such that a 75 Ohm transmission line would require L=3.4 nH. The resonance frequency is well over 1 GHz such that, for up to 1 GHz, a transmission line with an arbitrary number of detectors compensated with 3.4 nH inductors would simulate a 75 Ohm transmission line. The 3.4 nH can also be distributed around the detectors as 2×1.7 nH, leading to a design as shown in FIG. 14.

As indicated above, each current source/capacitor combination 710 represents a detector. FIG. 14 shows a number of these in series, separated by respective transmission line sections 720 (100 psec or on the order of 1 cm on board) having 75 Ohm impedance. The detectors are matched with 1.7 nH inductors 730. A 75 Ohm resistor 740 terminates the input of the transmission line. The output 750 of the transmission line feeds a low noise 75 Ohm RF amplifier (not shown). It should be understood that, although FIG. 14 shows six detectors, there is no limit on the number of detectors that can be combined by concatenating these sections, and up to the LC resonance frequency there is negligible impact on the attainable bandwidth for a large number of detectors. In practice the 1.7 nH inductors could be implemented in the PCB layout as narrower line sections, and a balanced transmission line with 100 Ohm differential impedance may be used to slightly improve noise figure.

As shown in FIG. 14, each current source/capacitor combination 710 represents a photo detector, where the current source is the detected current in the detector; and the capacitor represents the parasitic capacitance of the detector. Multiple detectors are connected with sections of transmission line (such as C2) and matching inductors (such as L2 and L2). The matching inductors are chosen such that the parasitic capacitance of the photo detectors is matched to the transmission line impedance (typically 75 Ohm). Thus multiple detectors can be combined, such that the detector currents are provided to the transmission line and propagate both to the output 750 and to the termination resistor 740 at the other end of the transmission line structure. The transmission line structure bandwidth is limited only by the inductive matching of the photo-diode capacitance and can be very large, exceeding 1 GHz. The output 750 is connected to an RF amplifier matched to the transmission line impedance, which amplifies the signals output from the transmission line structure. Note that use of a trans-impedance amplifier that is not matched to the transmission line structure would cause a very large reflection of the output signals back into the transmission line structure; a trans-impedance amplifier is not a preferable means to amplify the output from a transmission line receiver.

Figure 15:
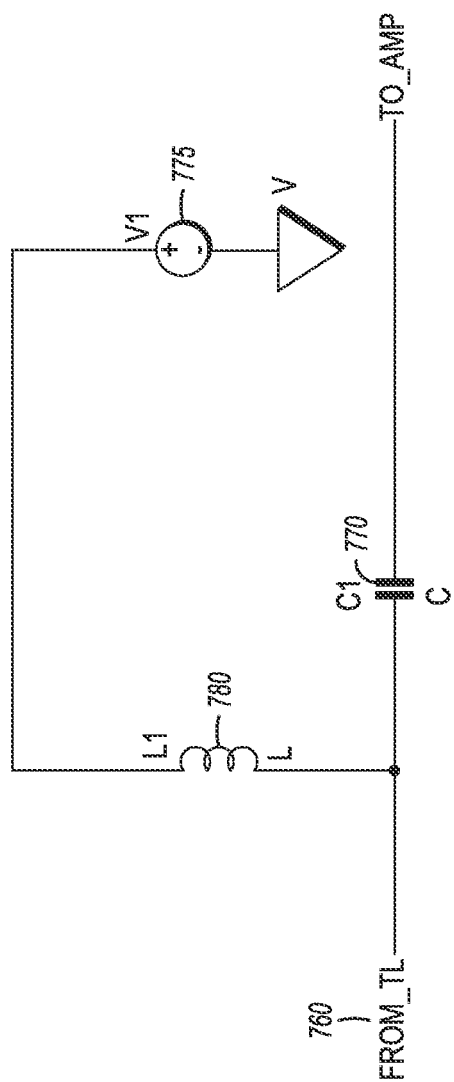
FIG. 15 shows a transmission line receiver connection to a biased amplifier.

Typically the photo detectors need to be biased, for instance with 5 V. In order to decouple the bias voltage from the amplifier, a decoupling capacitor may typically be used. The bias can then be provided via an inductor in a bias-tee arrangement as shown in FIG. 15, for example. The signal from the transmission line 760 is provided to an amplifier (not shown) via a capacitor (770) that passes high frequency signals, and bias from a voltage source 775 is provided to the transmission line via an inductor 780 that passes low frequency signals. The termination resistor 740 at the other end of the transmission line is thus capacitively decoupled to permit a DC bias. The current through voltage source 775 can be measured to determine photocurrent; the voltage source 775 could be constructed as a trans-impedance amplifier providing a constant voltage and an output proportional to the current provided. However, in implementations, the inductor 780 needs to be chosen with a value large enough that it does not affect the low frequency response of the amplifier. As a consequence, there may be a delay in the response of the current in the inductor 780 to a change in photo detector current, and this ten ds to cause a delay in the detection of photocurrent.

Figure 16:
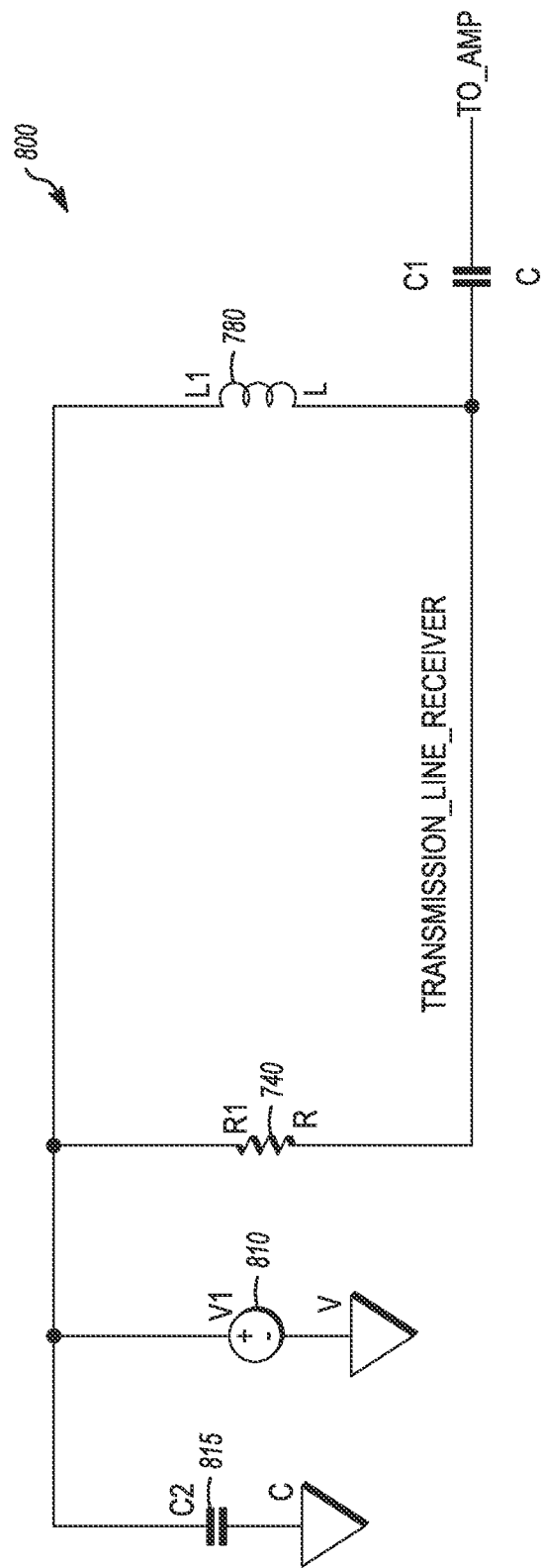
FIG. 16 shows a transmission line receiver with photocurrent detection at the termination side.

FIG. 16 shows an implementation 800 that uses both ends of the transmission line receiver structure to alleviate such a delay. The resistor R1 in FIG. 16 is the termination resistor 740 shown in FIG. 14, and the inductor L1 is the inductor 780 in FIG. 15. The voltage source 810 provides bias both to the termination resistor 740 and the inductor 780. The current in resistor 740 responds instantly to a photocurrent such that a fast detection of photocurrent is enabled. The inductor 780 can support large photocurrents without a significant voltage drop such that large photo currents can be supported without a significant drop in bias to the photo detectors. A capacitance 815 can be placed adjacent to the voltage source 810; for an ideal voltage source it may not carry any current because the voltage is constant. However at RF frequencies it can be difficult to realize a perfect voltage source, hence the capacitor 815 provides a low impedance to ground such that RF currents in the termination resistor 740 do not cause modulation of the voltage at the voltage source 810.

In order to realize an efficient detection circuit for the current in voltage source 810, the voltage source 810 is preferably implemented as a trans-impedance amplifier. A trans-impedance amplifier is a basic electronic circuit that holds a node between two current paths at a constant voltage and has an output that changes its output voltage in proportion to the current provided at that node. Thus, externally the trans-impedance amplifier looks like a voltage source to that node, but there is an additional output that represents the current provided. This output may then be used to drive a decision circuit to decide if a photo-current flows or not. Due to the fact that the trans-impedance amplifier is realized with a practical transistor circuit, it does not have infinite bandwidth, which means that it is not able to hold the node voltage constant for very high frequencies and for that reason the capacitor 815 may be added in some embodiments.

It should be understood that in some embodiments, the LC bias network prior to the amplifier (capacitor 770 and inductor 780) may be replaced by more complex circuits, or even with diplex filters—provided that the network provides a low-loss, high-frequency path from the transmission line detector to the amplifier, and a low-loss (low impedance) path at low frequency from the voltage source (trans-impedance amplifier) to the transmission line detector bias. It should also be noted that the trans-impedance amplifier may be implemented such that the output voltage first changes linearly as a function of photo-current, but then saturates at a photo-current that is sufficiently high.

In other implementations, a photocurrent detection circuit may be applied to each individual photo detector; optionally one electrode of a photo detector (for instance cathode) may be connected to an RF circuit and the other electrode (for instance anode) may be connected to an optical power detection circuit. This increases complexity, as a detection circuit is required per detector. Also, some embodiments may optionally use a trans-impedance amplifier per detector.

Figure 17:
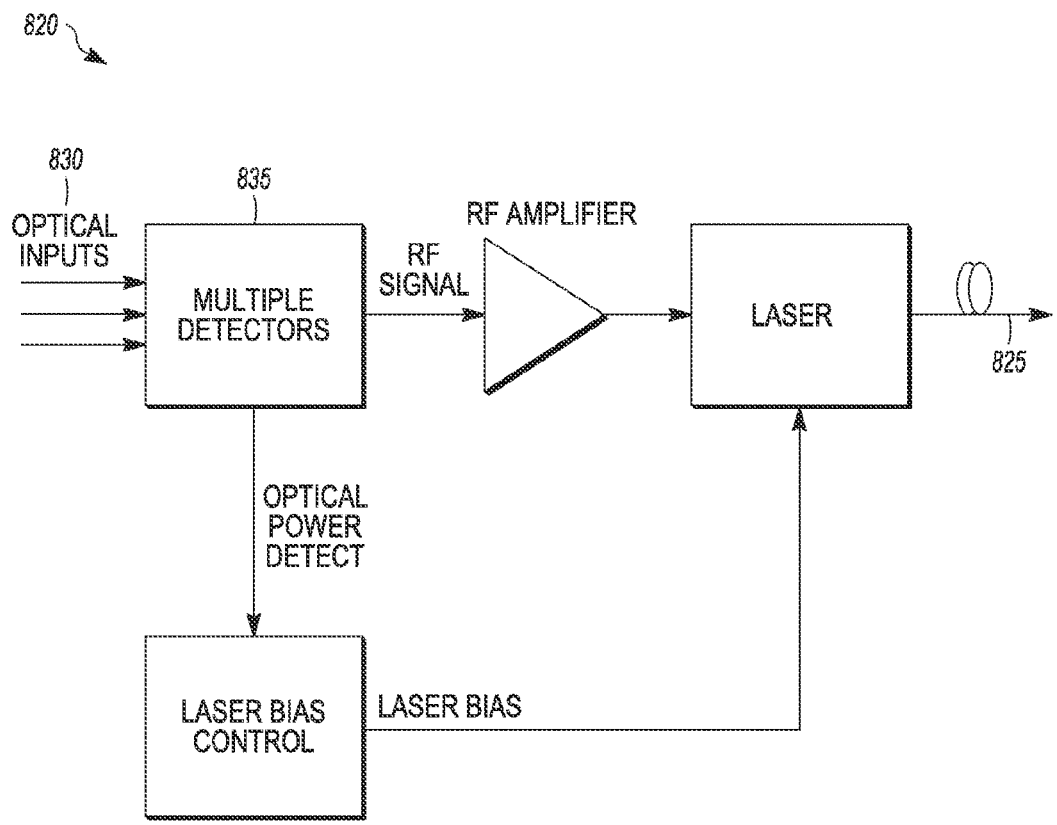
FIG. 17 shows an active combiner with multiple inputs and optical burst mode operation.
Figure 17:
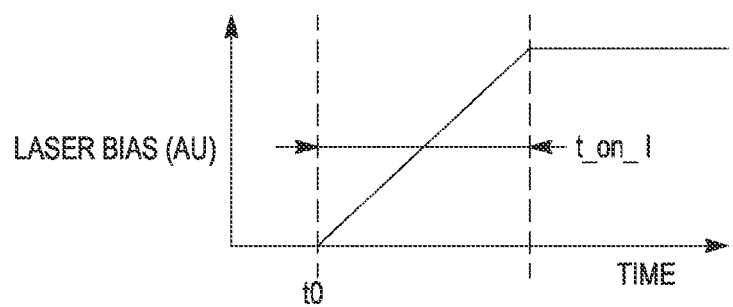

With an optical burst mode detection circuit, for instance of the type described above, the bias of a laser or the bias or gain of an amplifier may be controlled. FIG. 17 shows a multiple-detector receiver 820 that produces an output 825 signaling that power has been detected from any one of multiple inputs 830. This detection can be based on a detection method as described in the previous section or on multiple detector circuits that are monitoring individual detectors 835. When optical input has been detected at time t0 then the laser bias is turned on with a controlled rise time t_on_1 and the active combiner can re-transmit signals present at the inputs.

Figure 18:
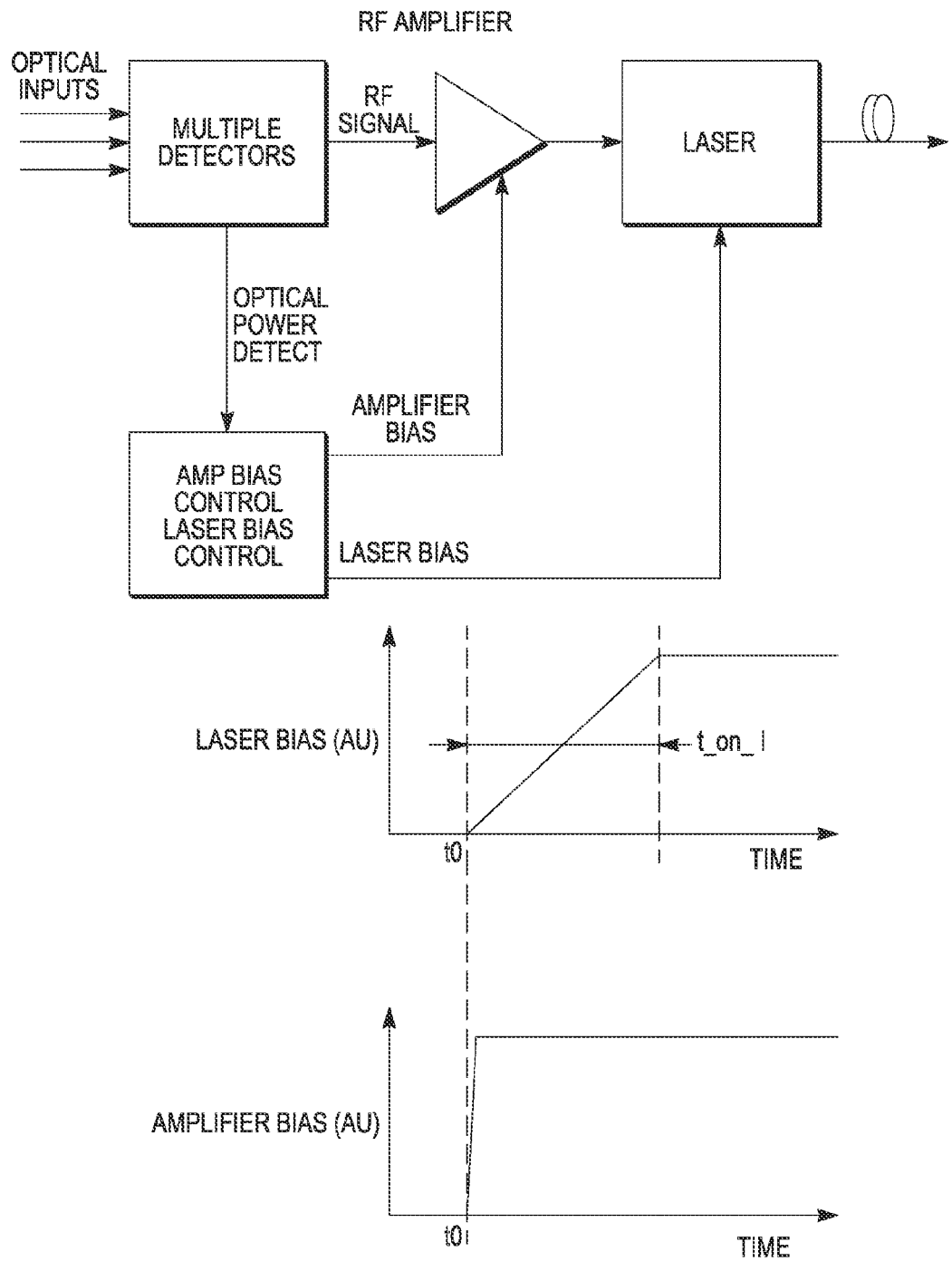
FIG. 18 shows an active combiner with optical burst mode operation including amplifier bias control.
Figure 19:
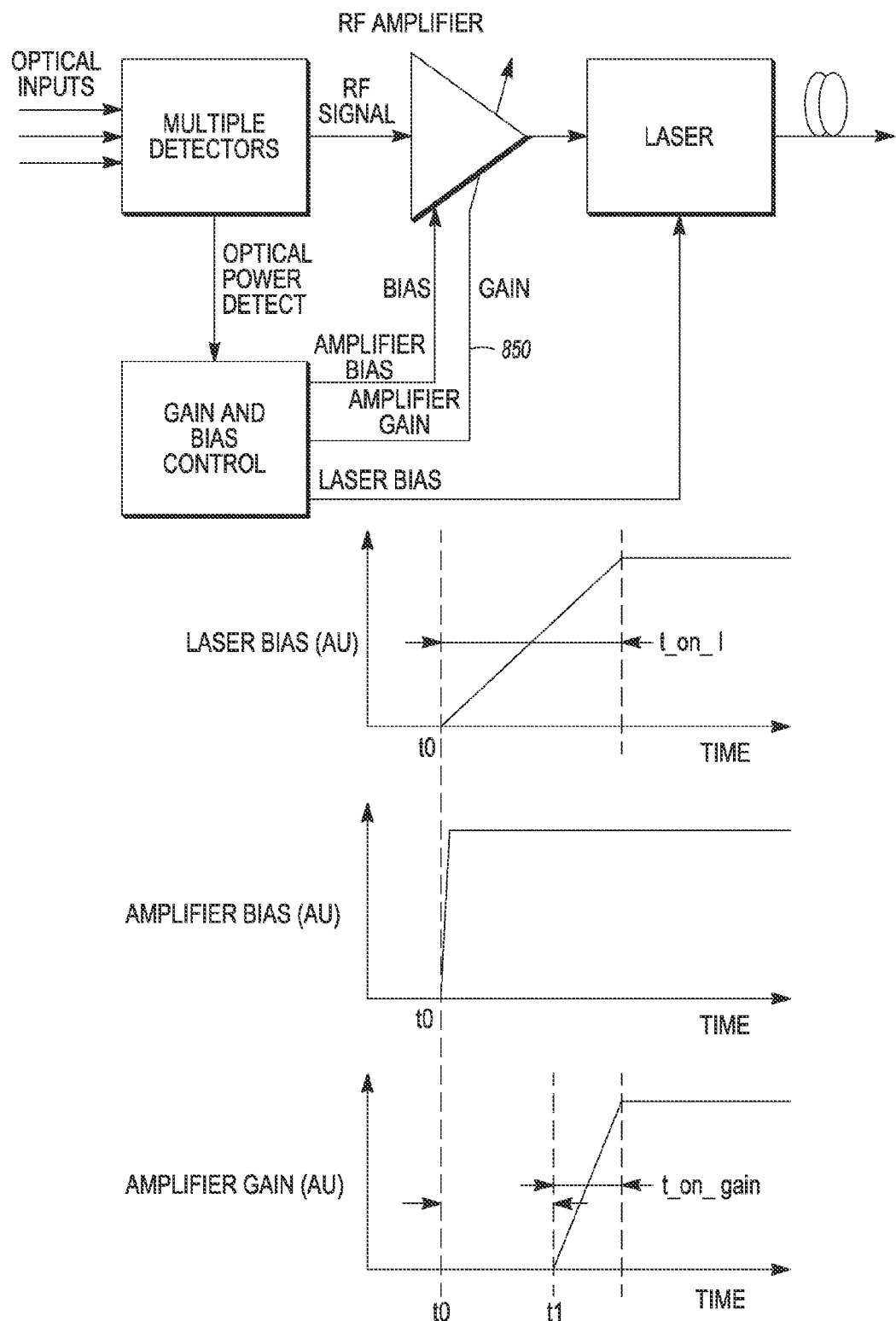
FIG. 19 shows an active combiner with OBM, laser bias, amplifier bias and gain control.

The optical burst mode detection can further be used to control the amplifier bias as shown in FIG. 18; when optical power is detected at t0 the amplifiers are immediately turned on. The laser turns on more slowly such that the amplifiers are settled by the time that the optical power is on. Optionally this scheme may be expanded by a third control signal 850 that controls the amplifier gain, as shown in FIG. 19.

Optical Modulation Index and Self Calibration

For implementations that permit operation of all upstream inputs of the active splitter simultaneously the total amount of photocurrent on the detectors following the upstream inputs can be high. The impedance of the bias circuit and, as discussed, of the aforementioned filtering means in the detector output path must be low.

In an existing RFoG system, the CMTS controls the output level of the cable modems' communications with ONUs that are transmitting RF signals to a head end such that a desired input level to the CMTS is obtained. This implies that the output level from a receiver preceding the CMTS is adjusted to a known level. If this receiver is of a type that has a known amount of gain such that an output level corresponds to a known optical modulation index, then this implies that the optical modulation index of channels provided to the CMTS is known—given the RF signal level to which the CMTS adjusts the channel. This requires a calibrated receiver that adjusts its gain as a function of the optical input level (2 dB gain increase for every dB reduction in optical input level) such that this fixed relation between RF output level and optical input level is maintained. The modulation index into the receiver is the modulation index of the upstream laser in the active splitter connected to that receiver; thus the CMTS implicitly controls the modulation index of that active splitter output.

The gain of the active splitter should preferably be set such that an output modulation index from that active splitter has a known relation to an input modulation index at one or more of the photo detectors receiving upstream signals from active splitters or ONUs further downstream. This requires knowledge of the photocurrents at these photo detectors, and preferably the active splitter can monitor the photo current of each upstream link by using one detector per upstream link as in a transmission line detector, for instance. Since some systems may operate in burst mode, these photo currents are not always available. However, in a DOCSIS system all ONUs are polled repeatedly to obtain an acknowledgement signal with an interval up to five minutes. This implies that upstream active splitters are re-transmitting the information, and all active splitters in such a system have each one of the upstream inputs active at least once every five minutes. The active splitter can thus record the burst levels and build a map of optical input levels to input ports. Using this information, the active splitter can set an internal gain level such that the upstream modulation index is maximized, but will not clip so long as the input signals to the active splitter are not clipping. Whereas the fiber length from head end to first active splitter is generally long, those fiber lengths between active splitters and those fiber lengths from active splitters to ONUs are generally short, and have little enough loss that the optical input power values to the different upstream input ports are close, and the optimal gain setting is similar for all ports. As a consequence, the optimal gain setting in the active splitter is almost the same for all input ports and the compromise in SNR from assuming a worst case reverse laser modulation index from a signal on any of the input ports is small.

As noted earlier, one embodiment could use the high and low optical output power setting for the reverse laser, instead of switching the laser between a high output power for burst transmission and an off state in between. Not only does this embodiment provide continuous information to active splitters about the link loss to the ONU, it also improves laser operation. When a laser powers on, the transient leads to a brief transition where laser distortion is high and RF input signals can be clipped. If a laser is held at a low power level instead of being in the off state before being turned on to a higher power level, then this transient is near absent and distortions and clipping are reduced. In case the laser is held at a high output power continuously, these transients and distortions are absent. The active splitter architecture permits operating the ONUs in any of these three modes and an optimum can be selected for system operation.

Whereas the upstream input power levels to detectors on an active splitter are typically similar, in some instances they may differ due to differences in connector loss or fiber loss. Preferably, all optical inputs would have the same level or have the same RF level following the detector for an equivalent channel load. Since the active splitter can monitor the power level at each detector and map those optical input levels, it can compute adjustments to optical input power level or in modulation index of those inputs that would be required to equalize the RF levels following the detectors of each input. The active splitter can communicate those preferred settings for output power level or gain for the reverse transmitters downstream that are connected to the inputs. The communication signals can be modulated onto a laser injected into the downstream signals or onto pump laser currents in EDFAs amplifying downstream signals. The modulation can be selected to be small enough, and in such a frequency band, that the communication signals do not interfere with the downstream payload.

Preferably, not only active splitters receive and interpret these communication signals, but also downstream ONU units receive and interpret the signals. This would permit essentially perfect alignment of the optical transmission level and RF gain of all units in an active splitter system. Given the presence of an upstream laser, and the ability of all components in an active splitter system to receive an upstream signal, all components in an active splitter system are capable of upstream communication with the addition of a simple tone modulation or other scheme. Thus, bidirectional communication is enabled, and active splitters and the head end can communicate with each other, self-discover the system, and setup optimal gain and optical levels.

One objective of the active splitter architecture is to provide accurate RF levels to the CMTS that represent an optical modulation index. Doing so is not trivial, and requires a specific self-calibration procedure (later described) that is expected to result in accurate modulation index correlation to active splitter head end receiver output RF level. The receiver is either a CMTS plug-in or is connected directly to the CMTS without unknown RF loss contributions in between (in case a tap is needed for other services than the CMTS, the tap can be integrated in the receiver to avoid external RF losses). As a consequence, the modulation index of the active splitter re-transmitter units is set precisely.

In case bidirectional communication is not available then the ONU output power level cannot be adjusted by the active splitter and the modulation index of the ONU will still have some uncertainty since the optical loss between ONU and the active splitter/receiver can vary; a +/−1 dB loss variation from ONU to active splitter would result in a +/−2 dB tolerance in RF level, thus a dynamic window will at least have to accommodate that variance and headroom for other tolerances and CMTS setup accuracy. This should be readily available for bandwidths up to 200 MHz such that even without the active splitter controlling the ONU, output power acceptable system performance can be obtained With the aforementioned bidirectional control additional system headroom can be obtained.

When 1200 MHz return bandwidth is used, such that ONUs are assigned 200 MHz widths of spectrum, the ONUs can all be operated a few dB below their clip point, i.e. just enough to cover the uncertainty in the loss from the ONU to the active splitter to avoid clipping of the ONUs. This optimizes the performance of the critical link from the ONU to the active splitter, so that 0 dBm ONUs are sufficient. In this type of operation, an arbitrary choice can be made for the number of ONUs operating with such a 200 MHz band, for instance up to six ONUs. This in turn would cause clipping in the active splitter transmitter, thus for 1200 MHz operation the gain of the active splitter receivers following the ONUs can be reduced by 8 dB, such that when six ONUs are transmitting 200 MHz of signal bandwidth, the active splitter reverse transmitter is operated just below clipping. This method of operation maximizes SNR and eliminates uncertainty; the impact of variation of the ONU to active splitter link is minimized, and the active splitter links are operated with a precise modulation index as with lower bandwidth RF return systems. The required dynamic window is reduced to tolerances in CMTS level setting and active splitter output level calibration to modulation index—comparable to a forward transmitter.

Analysis of attainable SNR by using the system just described for 1200 MHz operation with a maximum load of 200 MHz per ONU, results in a 5 dB improvement in the SNR attainable at 1200 MHz. This results in about 20% more throughput capacity in the system. With 1200 MHz of bandwidth, the total upstream data rate could be as high as 10 Gbs.

In case the system is initially set up so that the active splitter units expect a 1200 MHz return spectrum (instead of for instance 200 MHz) with a maximum of 200 MHz per ONU, then a penalty of around 7 dB occurs in terms of peak NPR performance. Therefore, the mode of operation preferably can be switched between normal operation, where a single ONU can occupy the entire spectrum, and high bandwidth operation where a single ONU can be assigned a limited amount of spectrum at any time and the active splitter reverse transmitters support the entire spectrum at once.

The proposed architecture has multiple re-transmission links that are preferably operated at the best possible modulation index on the assumption of perfect alignment of the NPR (Noise Power Ratio) curves of those links. As noted earlier, the alignment of the re-transmission in the active splitter return links is critical to obtain the best possible performance (every dB of misalignment directly results in a reduction of available SNR) hence a calibration technique is needed to set and hold the correct alignment of transmitter gain factors.

In order to provide such calibration, the active splitter return transmitter gain will be set accurately such that for a given detector current of the active splitter receiver diodes, the modulation index of the transmitter is equal to the modulation index input to the detector. This only requires knowledge of the detector current; the actual optical input power to the detector and the detector responsivity are irrelevant. In order to accomplish this, means are implemented at each detector to measure detector current such that an appropriate gain can be set for the return transmitter.

The gain may be set individually for each detector, but since multiple detectors can be receiving signals at the same time, this would require a controllable attenuator for every detector (32 detectors are in a typical active splitter unit). Preferably, a single attenuator is used for all detectors. This is achieved using variable output transmitters in the active splitter units, communicating to an upstream active splitter or variable output transmitters in ONUs communicating to an upstream active splitter. Outlined below is a method to set the output level of each of the reverse transmitters such that each transmitter provides the same photocurrent on the detector to which it is coupled. During normal operation, the active splitter receiver monitors the detector currents during bursts to enable issuance of a warning in case an optical link degrades or is lost.

For a 1310 nm reverse link from the active splitter to an upstream active splitter, the reverse laser power typically needs to be controlled from either 3-10 dBm or 6-10 dBm, depending on the design of the active splitter receiver. For a 1610 nm reverse link, these figures are typically 3-7 dBm or 6-7 dBm, respectively. These controls ensure that the power received at the end of a 25 km link, with some WDM loss, is at least 0 dBm. It should be understood that the numbers given are examples. The active splitter can transmit information in the forward direction through pump modulation of the EDFA or injection of a signal into the forward path. The latter is more expensive; the former results in a lower data rate, as only a minimal pump fluctuation can be allowed without affecting the forward path. A low data rate is sufficient, and can be read by a simple receiver—for instance a remote controller receiver operating in the kHz range coupled to a low cost processor. It should be understood that the downstream transmit function is only required in upstream active splitter units unless ONUs are being controlled as well. In the figures shown, that would be one out of 33 active splitter units in the system.

In a self-calibration run, the upstream active splitter unit transmits a command downstream to active splitter units to initiate self-calibration. Subsequently the downstream units randomly turn their transmitters on and off at full power with a low duty cycle, such that in nearly all cases at most one of the downstream units is on. The upstream active splitter reports information downstream as to which port is on, and what detector current it has obtained from that unit. The downstream units record that information in non-volatile memory. After all ports have been on at least once, or a time out has occurred (for instance if one or more ports are not connected), the upstream active splitter unit determines which downstream active splitter produces the smallest detector current. Next, the upstream active splitter computes how the upstream powers of each of the downstream units should be set, such that all detector currents are the same and fall within a specified range. That range can for instance correspond to 0-3 dBm (or 6 dBm) input power at the detectors. It should be understood that this can be accomplished by setting a photodetector current, and does not require measurement of an exact optical input power.

Generally, the active splitter upstream unit will set this power to the best (or maximum) value that can be obtained to optimize the SNR of the links. The active splitter units will then all have a known output power, and their internal gain will accordingly be set to have a calibrated modulation index for a given input power and modulation index. All links into an upstream active splitter may behave identically. The upstream active splitter unit may then take the downstream units out of calibration mode.

In case an additional port is lit up on an upstream active splitter receiver port, then the self-calibration algorithm can proceed without service interruption of already connected active splitter units. This is achieved by activating self-calibration on the downstream active splitter receiver that has just been activated. Its output will turn on and the upstream active splitter unit will then assign a port number to the new, hitherto unused port and set a power to the new unit, and take it out of calibration mode.

During normal operation, the upstream active splitter unit continues to monitor receiver currents for the incoming upstream links. If there is significant deviation, it may still issue a non-calibration mode downstream command to re-adjust power, and it can also signal plant issues upstream.

The active splitter units operated in the disclosed manner can also build a map of connected active splitter units. Also, a map can be created of upstream power from connected ONUs and statistics on individual ONU operation and link loss can be collected, for instance to locate chattering ONUs or poor ONU connections.

The head end transmitter can also send a command to downstream active splitter units to initiate calibration or change a mode of operation (for instance from 200 MHz to 1200 MHz optimized operation). Any other type of bidirectional EMS system monitoring can be envisioned for active splitter units that can receive and transmit low data rate traffic. It should be understood that this does not require complex or costly HFC EMS systems; minor optical power fluctuations by either pump power variation or low level signal injection in the downstream signal path, or reverse laser power variation in the upstream path, are sufficient to detect binary or kHz range (like remote control chips) modulated data patterns. It should also be understood that the most expensive option—injection of a downstream optical signal—is only relevant at the head end, or in the upstream path typically only relevant in 1 out of 33 active splitter locations.

Another important consideration is that the CMTS should set up modem levels correctly. In regular return or RFoG systems, there is considerable uncertainty in system levels due to RF components or applied combiner networks. In the active splitter system, however, there are no RF components in the link, the service group is aggregated in the optical domain, and only one low gain, low performance, and low output level receiver is required which is coupled directly to the CMTS return port. In some embodiments, it may be desirable to produce a dedicated active splitter receiver with an accurately calibrated output level as a function of input modulation index. Such a receiver has no need for a wide input range; −3 to +3 (or 0 to +6) dBm is sufficient. The high input level implies that the gain can be low. The absence of RF combining following the receiver also means that the output level can be low. Therefore, such a receiver should be obtainable in a high density, low power form factor. With such a receiver, little if any RF wiring may be required in the head end, and the CMTS can accurately set reverse levels to obtain the correct optical modulation index. In some cases, there may be a need to connect other equipment than the CMTS to the reverse path. The receiver may use an auxiliary output to provide for this functionality, rather than the main output with external RF splitters. This eliminates any level uncertainty due to RF components between the receiver and the CMTS.

Embodiments

Some embodiments of the foregoing disclosure may encompass multiple cascaded active splitters that are configured to work with ONUs based primarily on optical input levels without requiring bidirectional communication. Other embodiments may encompass multiple cascaded active splitters that are configured to work with ONUs by using bidirectional communication.

Some embodiments of the foregoing disclosure may include an active splitter with multiple optical inputs, each providing an optical input to one or more detectors that together output a combined signal to a high pass filter that presents a low impedance to the detectors and rejects all signals below an RF frequency band and passes all signals above an RF frequency band before presenting the combined signal to an amplifier and a re-transmitting laser.

Some embodiments of the foregoing disclosure may include an active splitter with multiple optical inputs, each providing an optical input to one or more detectors that together output a combined signal, where the active splitter has a bias circuit with a sufficiently low impedance at low frequency such that all detectors can be illuminated at the same time without a significant drop in bias to the detectors.

Some embodiments of the foregoing disclosure may include an active splitter with a reverse laser where the reverse laser turns on when a photocurrent at the active splitter input detectors is above a threshold, and where the slew rate when the laser turns on is limited such that it does not create a transient having a spectrum that interferes with the upstream spectrum to be transmitted.

Some embodiments of the foregoing disclosure may include an RFoG active splitter architecture where reverse lasers of the active splitter(s) and/or ONUs connected to the active splitter(s) are operated with a continuous output. Some embodiments of the foregoing disclosure may include an RFoG active splitter architecture where reverse lasers of the active splitter(s) and/or ONUs connected to the active splitter(s) are operated between a high and a low power mode such that the output power is high during bursts of upstream transmission and is otherwise low in output. Some embodiments of the foregoing disclosure may include an RFoG active splitter architecture where reverse lasers of the active splitter(s) and/or ONUs connected to the active splitter(s) may be selectively set to either one of a continuous mode and a burst mode.

Some embodiments of the foregoing disclosure may include an RFoG ONU that switches between a high and a low output power state where the output power is high during burst transmission of information and where the low output power state is above the laser threshold.

Some embodiments of the foregoing disclosure may include an RFoG system that measures detector currents at all inputs, building a table of detector currents during high and low (or no) input power to the optical inputs and computes, based on that table, a gain value such that a modulation index of the reverse transmitting laser has a known relation to a modulation index at the optical inputs to the active splitter, such that the reverse transmitting laser has an optimal modulation index but clipping is prevented, even for the port with the highest optical input. In some embodiments of the foregoing disclosure, the optimal modulation index of the reverse transmitter is nominally the same as that for the optical inputs.

Some embodiments of the foregoing disclosure may include an RFoG ONU with an RF signal detector that detects bursts of input signals and activates a laser at a high power mode when a burst is detected and otherwise activates the laser at a low power mode, such as zero power. An electrical attenuator may precede the laser driver and may attenuate an RF input signal, such that in the low output power state the laser cannot be clipped by an RF input signal. The RF attenuation before the laser may be reduced as the laser power increases from the low power state, such that the RF attenuation is rapidly removed to have minimal impact on the burst but during the transition, the laser still is not clipped.

Some embodiments of the foregoing disclosure may include an RFoG ONU with an RF signal detector that detects bursts of input signals and includes an electrical attenuator that precedes the laser driver to attenuate the RF input signal, such that when no nominal input is present noise funneling by the ONU of weak noise signals into the ONU is prevented and RF attenuation is rapidly removed when a burst is detected to have minimal impact on the burst.

Some embodiments of the foregoing disclosure may include an RFoG ONU that can receive a downstream signal instructing it to adjust output power level, RF gain or both. In some embodiments, such an ONU can receiver assigned port numbers and status monitoring requests. In some embodiments, such an ONU can transmit upstream information such as status, serial number, etc.

Some embodiments of the foregoing disclosure may include an active splitter than can transmit a downstream signal with requests to downstream units to adjust optical power level, gain or to request status information. Some embodiments may include an active splitter that can receive such downstream signals. Some embodiments may include an active splitter that can transmit and/or receive such signals in the upstream direction, as well.

Some embodiments of the foregoing disclosure may include an ONU with an RF detector, an attenuator, a bias circuit, and a microcontroller where the microcontroller estimates laser clipping based on measured RF power levels and tracks what fraction of the time the laser is clipping and increases attenuation in case this fraction exceeds a threshold. The microcontroller may also adjust laser bias to prevent clipping. In some embodiments, the microcontroller brings attenuation to a nominal value when RF power to the laser is at or below a nominal value. In some embodiments, changes in attenuation made by the microcontroller take place in discrete steps in time and magnitude.

In some embodiments of the foregoing disclosure the microcontroller may set the attenuation to a high enough level to prevent clipping but less than needed to obtain a nominal modulation index.

Some embodiments of the foregoing disclosure may include a bidirectional RF-over-fiber architecture with more than one re-transmission link in the reverse direction, where detected signals from preceding links are combined at each re-transmission link.

Some embodiments of the foregoing disclosure may include a calibrated receiver at a head-end that provides a specific RF output level for an input modulation index, with a gain control such that for different optical input levels, the RF output level for a given modulation index is held constant. In some embodiments, a receiver may include two outputs, at least one connected to a CMTS without any RF combining and splitting networks.

Some embodiments of the foregoing disclosure may include an active splitter with at least two gain settings, one gain setting optimized for ONUs that can transmit the full reverse spectrum that the system can support, and one setting optimized for ONUs that can transmit an amount of spectrum less than the full spectrum that the system can support, where the active splitter combines inputs from multiple ONUs and can transmit the full spectrum that the system can support.

Some embodiments of the foregoing disclosure may include an active splitter having adjustable reverse transmission power and adjustable gain such that, for a given received upstream signal modulation index, the active splitter maintains a constant optical modulation index irrespective of optical output power. In some embodiments, the retransmitted optical modulation index is the same as the received optical modulation index. In some embodiments, the retransmitted optical modulation index is a predetermined fraction of the received optical modulation index, and the splitter enables an option to vary that fraction.

Some embodiments of the foregoing disclosure may include an active splitter that can receive and decode forward communication signals, e.g. an input-monitoring diode for an EDFA, or another monitoring diode.

Some embodiments of the foregoing disclosure may include an active splitter that can transmit forward communication signals, with for instance a forward laser, or by modulating the pump current of an EDFA.

Some embodiments of the foregoing disclosure may include an active splitter that can receive and decode upstream communication signals, e.g. by monitoring upstream detector currents. Some embodiments of the foregoing disclosure may include an active splitter that can transmit upstream communication signals, e.g. by modulating the reverse laser.

Some embodiments of the foregoing disclosure may include a system with at least two active splitters where a first active splitter instructs a second active splitter to adjust its reverse transmission power level. Some embodiments may use an algorithm to equalize and optimize the reverse transmit level of all downstream active splitters connected to an upstream active splitter. I some embodiments, the algorithm is executed automatically at start up such that downstream active splitters (and optionally ONUs) obtain an address and optionally report in the upstream direction the splitter's (or ONU's) serial number and status. In some embodiments, later activation of ports in the splitter leads to an automatic calibration of new ports without interrupting the service of existing ports, and with continuous monitoring of port health.

Some embodiments of the foregoing disclosure may include an active splitter capable of upstream communication, and capable of receiving and decoding upstream communications from another splitter.

In some embodiments, an active splitter may establish a map of the system in which it is included, and may report system status and topology information to a head, end and may issue alarms if necessary. The map may include serial numbers of active splitters, and may include serial numbers of connected ONUs. Some embodiments may create a system map automatically, and (i) may monitor ONU link input levels to active splitters; (ii) may detect chattering or otherwise defective ONUs and optionally instruct active splitter to shut down detectors of defective or chattering ONUs; and/or (iii) may monitor the status of the active splitter that constructs the map. In some embodiments, the monitoring function is used to automatically trigger route redundancy by monitoring upstream traffic on a link, to determine if the link is intact, and if the link is found to be defective, switching downstream traffic to an alternate upstream link. In some embodiments, upstream active splitters monitor downstream active splitters by communicating with downstream active splitters.

Some embodiments of the foregoing disclosure may include a head end that instructs downstream active splitters to initiate a self-calibration procedure.

Some embodiments include a combiner that can monitor each of the upstream input ports and thus detect a loss of a link to such a port. The loss of an upstream link implies that the associated downstream link has been lost. Detection of a link can be used to initiate switching over to a redundant fiber link, preferably following a different fiber route.

In one or more examples, the functions described herein may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The invention claimed is:

1. A contributing optical splitter/combiner configured to function passively without electrical power, the contributing optical splitter/combiner connected via a fiber to an aggregating optical splitter/combiner with at least one output port located upstream from the contributing optical splitter/combiner, the contributing optical splitter/combiner comprising:
   one or more detectors for detecting reverse path optical signals received from one or more optical network units (ONU) and configured for detecting forward path optical signals received from the upstream aggregating optical splitter/combiner
   at least one additional detector for detecting a light injected in a forward path by a pump laser by the upstream aggregating optical splitter/combiner,
   a powering circuit configured to use the forward path light from the upstream aggregating optical splitter/combiner's pump laser to provide electrical power to the contributing optical splitter/combiner, powering at least one of downstream circuitry or upstream circuitry in the contributing optical splitter/combiner for processing the respective reverse path optical signals and forward path optical signals.

2. The contributing optical splitter/combiner of claim 1, wherein the contributing optical splitter/combiner is without an electrical power connection.

3. The contributing optical splitter/combiner of claim 1, wherein the contributing optical splitter/combiner and the aggregating optical splitter/combiner are located within a close enough proximity to each other that the fiber connecting the combiners is of a length that the light injected in to the fiber from the pump laser is sufficient to power the downstream and upstream circuitry for outputting upstream and downstream signals in response to the received optical signals.

4. The contributing optical splitter/combiner of claim 1, further comprising at least one amplifier for amplifying the reverse path optical signals.

5. The contributing optical splitter/combiner of claim 4, wherein the amplifier is powered on when the optical power is detected by the at least one additional detector.

6. The contributing optical splitter/combiner of claim 4, further comprising at least one laser for re-transmitting the amplified reverse path optical signals.

7. The contributing optical splitter/combiner of claim 6, wherein the laser is turned on when optical power is detected by the at least one additional detector.

8. The contributing optical splitter/combiner of claim 1, further comprising a battery that accumulates power from the pump laser for powering an amplifier and laser in the contributing optical splitter/combiner.

9. The contributing optical splitter/combiner of claim 1, wherein an optical amplifier for the forward path light is optically pumped in the aggregating optical splitter/combiner by at least one of a 980 nm pump laser or a 1480 nm pump laser, and
wherein at least one of a 980 nm pump laser, a 1480 nm pump laser or an 850 nm pump laser provides forward path light to the splitter/combiner for powering the contributing optical splitter/combiner.

10. The contributing optical splitter/combiner of claim 1, wherein the pump laser has a fiber attenuation of not more than 1 dB of loss per 1 km of fiber.

11. The contributing optical splitter/combiner of claim 1, wherein the length of fiber between the combiners is not more than 3 km.

12. The contributing optical splitter/combiner of claim 1, wherein the at least one additional detector is at least one of a Si detector, an InGaAsP detector based on InP, or an InGaAsP detector based on GaAs.

13. The contributing optical splitter/combiner of claim 1, further comprising a transistor amplifier for amplifying the reverse path optical signals and a laser for re-transmitting the amplified reverse path optical signals,
wherein the one or more detectors are arranged in a transmission line structure and an output of the transmission line structure is provided to the transistor amplifier with an input impedance matched to a transmission line impedance and an output impedance matched to a laser impedance.

14. The contributing optical splitter/combiner of claim 13, wherein a supply voltage to the one or more detectors is greater than 5 times the rms value of an RF signal output from the transmission line structure to the transistor amplifier, and a supply voltage to the transistor amplifier is less than a supply voltage to the one or more detectors but not higher than a supply voltage to a laser bias circuit.

15. The contributing optical splitter/combiner of claim 14, wherein the supply voltage to the transistor amplifier is not higher than the voltage drop across a laser used to transmit upstream signals.

16. The contributing optical splitter/combiner of claim 1, wherein the contributing optical splitter/combiner is one of a plurality of contributing combiners is remotely powered by the aggregating combiner.

17. The contributing optical splitter/combiner of claim 16, wherein the remote powering by the aggregating combiner contributing optical splitter/combiner causes passive behavior of the contributing optical splitter/combiner such that the contributing combiners do not require additional electrical power.

* * * * *